(12) United States Patent
Tu et al.

(10) Patent No.: US 11,804,603 B2
(45) Date of Patent: Oct. 31, 2023

(54) ELECTRODES FOR LITHIUM-ION BATTERIES AND OTHER

(71) Applicant: Factorial Inc., Woburn, MA (US)

(72) Inventors: Yaqi Tu, Woburn, MA (US); Guopeng Fu, Woburn, MA (US); Jonghwan Park, Woburn, MA (US); Dong Ren, Woburn, MA (US)

(73) Assignee: Factorial Inc., Woburn, MA (US)

( * ) Notice: Subject to any disclaimer, the term of this patent is extended or adjusted under 35 U.S.C. 154(b) by 0 days.

(21) Appl. No.: 17/739,451

(22) Filed: May 9, 2022

(65) Prior Publication Data
US 2022/0263094 A1   Aug. 18, 2022

Related U.S. Application Data

(63) Continuation of application No. 16/512,502, filed on Jul. 16, 2019, now abandoned.

(51) Int. Cl.
*H01M 4/00* (2006.01)
*H01M 4/62* (2006.01)
(Continued)

(52) U.S. Cl.
CPC .............. *H01M 4/62* (2013.01); *H01G 11/06* (2013.01); *H01G 11/26* (2013.01); *H01G 11/46* (2013.01);
(Continued)

(58) Field of Classification Search
CPC .. H01M 4/62; H01M 50/446; H01M 10/0562; H01M 10/0525; H01M 10/0585;
(Continued)

(56) References Cited

U.S. PATENT DOCUMENTS

2001/0011119 A1   8/2001   Naijo et al.
2002/0114997 A1   8/2002   Lee et al.
(Continued)

FOREIGN PATENT DOCUMENTS

CN   206022539 U   3/2017
JP   2000149920 A   5/2000
(Continued)

OTHER PUBLICATIONS

Higashi et al/, Electrode Sheet, All-Solid Battery, Manufacturing Method for Electrode Sheet, and Manufacturing Method for All-Solid Battery, Oct. 2018, See the Abstract. (Year: 2018).*

*Primary Examiner* — Cynthia H Kelly
*Assistant Examiner* — Monique M Wills

(57) ABSTRACT

The present disclosure generally relates to various electrodes suitable for electrochemical devices such as batteries, capacitors, sensors, condensers, electrochromic elements, photoelectric conversion elements, etc. Some embodiments are generally directed to electrode materials surrounded by electrolyte, e.g., filling in porous spaces within the electrode. For example, one aspect is generally directed to an electrochemical device comprising an electrode comprising particles. Some or all of the particles may be surrounded by an electrolyte, such as a solid electrolyte. Other aspects of the invention are generally directed to devices including such electrodes, methods of making or using such electrodes, kits including such electrodes, or the like.

17 Claims, 4 Drawing Sheets

(51) Int. Cl.
*H01G 11/06* (2013.01)
*H01G 11/26* (2013.01)
*H01G 11/46* (2013.01)
*H01G 11/56* (2013.01)
*H01M 4/131* (2010.01)
*H01M 4/134* (2010.01)
*H01M 10/0525* (2010.01)
*H01M 10/0565* (2010.01)
*H01B 1/08* (2006.01)
*H01M 4/38* (2006.01)
*H01M 4/505* (2010.01)
*H01M 4/525* (2010.01)

(52) U.S. Cl.
CPC ............ *H01G 11/56* (2013.01); *H01M 4/131* (2013.01); *H01M 4/134* (2013.01); *H01M 10/0525* (2013.01); *H01M 10/0565* (2013.01); *H01B 1/08* (2013.01); *H01M 4/382* (2013.01); *H01M 4/505* (2013.01); *H01M 4/525* (2013.01); *H01M 2300/0082* (2013.01)

(58) Field of Classification Search
CPC .... H01M 4/0404; H01M 4/139; H01M 50/46; Y02E 60/10
See application file for complete search history.

(56) References Cited

U.S. PATENT DOCUMENTS

| | | |
|---|---|---|
| 2007/0099089 A1 | 5/2007 | Miura et al. |
| 2014/0170465 A1 | 6/2014 | Visco et al. |
| 2018/0114979 A1 | 4/2018 | Yoon et al. |
| 2018/0151920 A1 | 5/2018 | Castledine et al. |
| 2020/0144665 A1 | 5/2020 | Huang et al. |
| 2020/0144667 A1* | 5/2020 | Huang .................. C08G 18/73 |
| 2020/0203677 A1 | 6/2020 | Lee et al. |
| 2020/0381710 A1 | 12/2020 | Ji et al. |
| 2021/0126281 A1 | 4/2021 | Francisco et al. |
| 2021/0151794 A9 | 5/2021 | Huang et al. |
| 2021/0151795 A9 | 5/2021 | Huang et al. |

FOREIGN PATENT DOCUMENTS

| | | | |
|---|---|---|---|
| JP | 2013201094 A | 10/2013 | |
| WO | 2002078114 A1 | 10/2002 | |
| WO | WO-2018180768 A1 * | 10/2018 | .......... H01M 10/052 |

* cited by examiner

ELECTRODES FOR LITHIUM-ION BATTERIES AND OTHER

The present application is a continuation application of U.S. Ser. No. 16/512,502, filed Jul. 16, 2019, the entire content of which is incorporated herein by this reference for all purposes.

FIELD

The present disclosure generally relates to various electrodes suitable for electrochemical devices such as batteries, capacitors, sensors, condensers, electrochromic elements, photoelectric conversion elements, etc.

BACKGROUND

Accompanying the rise of energy densities of lithium-ion batteries (LIBs) and the expansions of scale, finding a solution to the safety concerns of LIBs becomes more important for LIB development. Safety issues existing in LIBs may arise from the use of mixed flammable solvents such as carbonate/ether as solvent systems, which, in the case of overcharging, short-circuiting, over-heating, etc. can lead to serious accidents from LIBs catching on fire, burning or even exploding, etc.

In solid-state lithium battery, there are different kinds of electrolytes, including inorganic, organic, and composite electrolytes. It may be hard to provide good contact between the electrode materials and the electrolyte. With loose or no contact, the capacity of the battery cannot be fully reached, and the internal resistance of the battery would be relatively high, which can limit battery performance. Accordingly, improvements in electrolytes are needed.

SUMMARY

The present disclosure generally relates to various electrodes suitable for electrochemical devices such as batteries, capacitors, sensors, condensers, electrochromic elements, photoelectric conversion elements, etc. The subject matter of the present invention involves, in some cases, interrelated products, alternative solutions to a particular problem, and/or a plurality of different uses of one or more systems and/or articles.

In one aspect, the present invention is generally directed to an electrochemical device.

In one set of embodiments, the electrochemical device comprises particles and a solid electrolyte. In some cases, at least 50 vol % of interstices between the particles comprise the solid electrolyte.

The electrochemical device, in accordance with another set of embodiments, comprises an electrode comprising particles, and a solid electrolyte. In some embodiments, at least 90% of the particles are in contact with the solid electrolyte.

In yet another set of embodiments, the electrochemical device comprises a porous electrode, and a solid electrolyte present in at least 90 vol % of a porous volume of the electrode.

According to still another set of embodiments, the electrochemical device comprises a porous electrode, and a solid electrolyte contained within pores of the porous electrode. In certain instances, the solid electrolyte allows the electrode to achieve at least 75% design capacity.

In another aspect, the present invention is generally directed to an electrode.

In one set of embodiments, the electrode comprises particles and a solid electrolyte. In some cases, at least 50 vol % of interstices between the particles comprise the solid electrolyte.

The electrode, in another set of embodiments, comprises particles and a solid electrolyte, where at least 90% of the particles are in contact with the solid electrolyte.

The electrode, in still another set of embodiments, is a porous electrode, where the electrode comprises a solid electrolyte present in at least 90 vol % of a porous volume of the electrode.

In yet another set of embodiments, the electrode is a porous electrode, where the electrode comprises a solid electrolyte contained within pores of the porous electrode. In some cases, the solid electrolyte allows the electrode to achieve at least 75% design capacity.

In still another aspect, the present invention is generally directed to a method of making an electrode.

In accordance with one set of embodiments, the method comprises pressing a plurality of particles together to form an electrode precursor, exposing the electrode precursor to a solvent comprising an electrolyte precursor, removing at least some solvent from the electrode precursor, and solidifying the electrolyte precursor within the electrode precursor to form an electrode comprising particles and solid electrolyte.

In another set of embodiments, the electrode comprises an electrode comprising particles, wherein at least 75% of the particles are surrounded by electrolyte. In some cases, pores or interstices between the particles may be filled by an electrolyte.

In some cases, an electrolyte such as those described herein may comprise one or more of a polymer, a crosslinkable oligomer, a plasticizer, and/or lithium salt. Some examples of these are described herein. For example, in one embodiment, the polymer may comprise one or more of:

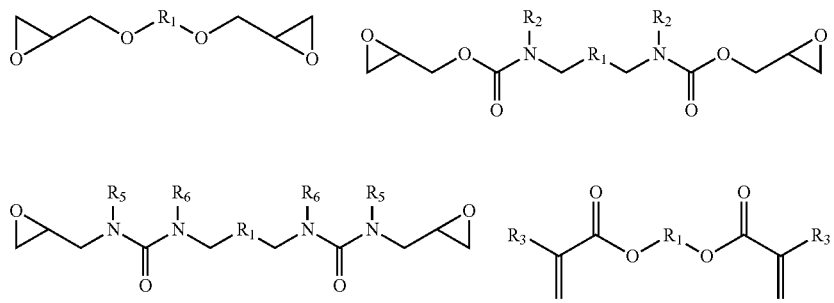

-continued

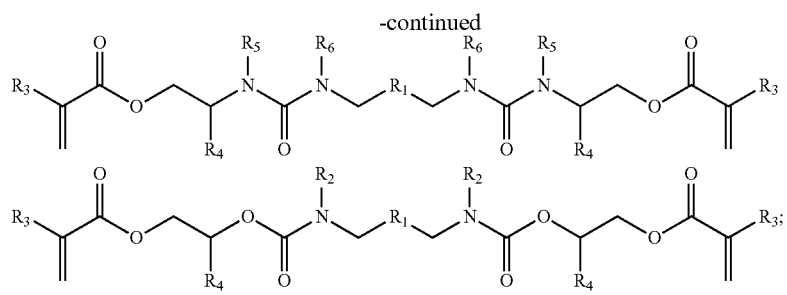

where R₁ comprises one or more of:

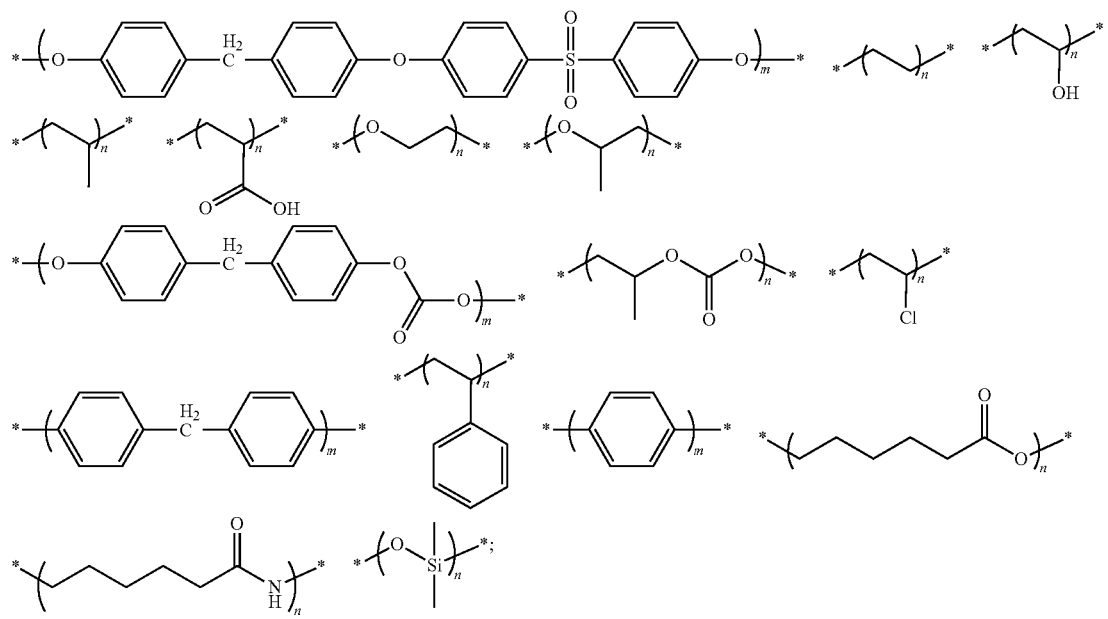

where n is an integer between 1 and 10,000, inclusive; where m is an integer between 1 and 5,000, inclusive; where $R_2$, $R_3$, $R_4$, $R_5$, and $R_6$ are each independently selected from the group consisting of:

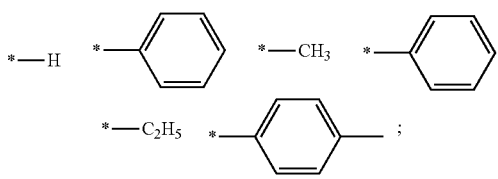

and where * indicates a point of attachment.

In another aspect, the present invention encompasses methods of making one or more of the embodiments described herein, for example, methods of making electrodes. In still another aspect, the present invention encompasses methods of using one or more of the embodiments described herein, for example, methods of using electrodes.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present disclosure generally relates to various electrodes suitable for electrochemical devices such as batteries, capacitors, sensors, condensers, electrochromic elements, photoelectric conversion elements, etc. Some embodiments are generally directed to electrode materials surrounded by electrolyte, e.g., filling in porous spaces within the electrode. For example, one aspect is generally directed to an electrochemical device comprising an electrode comprising particles. Some or all of the particles may be surrounded by an electrolyte, such as a solid electrolyte. Other aspects of the invention are generally directed to devices including such electrodes, methods of making or using such electrodes, kits including such electrodes, or the like.

Some aspects of the present invention are generally directed to electrodes comprising particles. In some embodiments, some or all of the particles are surrounded by an electrolyte, such as a solid electrolyte. For example, in some cases, at least some of the pores or interstices between the particles may be filled by an electrolyte. Since the particles can be surrounded by electrolyte such that at least some of the pores or interstices are filled by electrolyte, contact between the particles and the electrolyte may be very close. This may allow the internal resistance of the electrochemical device to be lower, which may allow the electrochemical device to exhibit higher capacities.

Figure 1A:
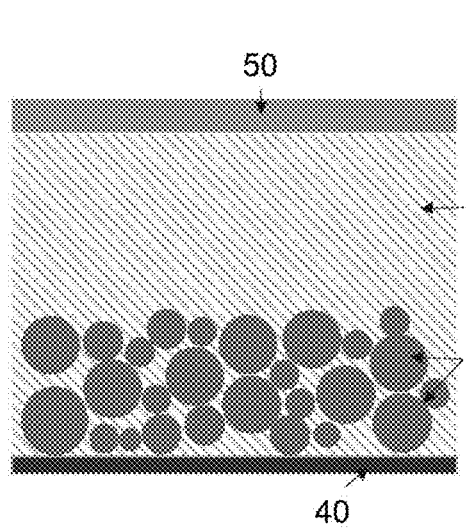
FIGS. 1A and 1B are schematic diagrams illustrating various electrochemical devices.

Turning first to FIG. 1A, a schematic diagram of one non-limiting embodiment is now described. In this figure, electrochemical device 10 includes particles 30 forming an electrode (e.g., a cathode) and a counterelectrode (e.g., an anode) 50. A electrolyte 20, which may be a solid electrolyte, separates the electrode and the counterelectrode. Electrode 30 is in electrical communication with current collector 40, while the counterelectrode may also be in electrical communication with a current collector (not shown in FIG. 1A). Electrochemical device 10 may be a battery (e.g., a lithium ion battery), or other devices such as those described herein. For example, if electrochemical device 10 is a lithium-ion battery, then electrode 30 may be an cathode, and counterelectrode 50 may be an anode (for example, comprising lithium metal).

In one set of embodiments, particles 30 forming the electrode may be in substantive contact with each other and/or current collector 40, e.g., defining an electrode such as a cathode, within the electrochemical device. As is shown in this figure, the particles forming the cathode are substantially spherical, although enough particles are in physical contact with each other to allow current to flow between the particles. It should, however, be understood that this is an idealized schematic drawing, and in reality, the particles need not be perfectly spherical. However, because the particles cannot be closely packed together (e.g., due to their shape), there may be interstices, pores, or gaps, etc., between the particles, as is shown here.

According to certain embodiments, some of electrolyte 20 may be present within those interstices. While the electrolyte may not necessarily fill all of the volume of the interstices between the particles, in some cases, a relatively large volume fraction of the interstitial space between the particles may be filled with the electrolyte, e.g., at least half of the interstitial volume, or more. In contrast, in many prior art devices, such as is depicted in FIG. 1B, the solid electrolyte does not fill the interstitial space between the particles.

Thus, it can be observed that a substantial percentage of particles 30 are in direct physical contact with solid electrolyte 20. For example, at least half, or more, of the particles may come into physical contact with the solid electrolyte (FIG. 1 illustrates that all of the particles are in contact with the electrolyte, but it should be understood that not all of the particles must necessarily be in contact with the electrolyte, although they can be). Without wishing to be bound by any theory, it is believed that such a structure may allow the internal resistance between the particles and the electrolyte of the electrochemical device to be lower and the conductivity to be higher, which may allow the electrochemical device to exhibit higher capacities. For example, such an arrangement may allow the electrochemical device to achieve at least 50%, or more, of its theoretical design capacity, as discussed below.

Figure 1B:
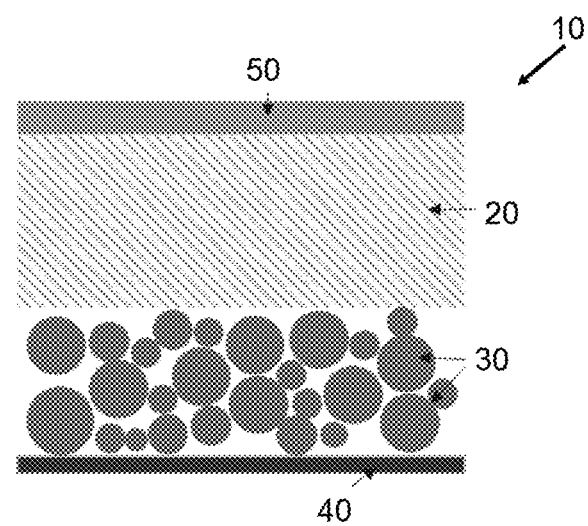

In contrast, prior art electrochemical devices such as those described in FIG. 1B may not be able to exhibit such capacities, e.g., due to the lack of penetration of solid electrolyte 20 into electrode 30. It should be understood that some penetration of the solid electrolyte into the particle layer may still occur, as FIG. 1B represents an idealized schematic diagram; for instance, in reality, some solid electrolyte may be present within some of the interstices of the particles, e.g., due to diffusion, unevenness in the particle layer, or the like. However, most of the particles will not be in physical contact with the solid electrolyte, and the solid electrolyte is not able to significantly penetrate into interstitial volume between the particles.

The above discussion is a non-limiting example of one embodiment of the present invention comprising electrodes comprising particles and solid electrolyte. However, other embodiments are also possible. Accordingly, more generally, various aspects of the invention are directed to various electrodes suitable for electrochemical devices such as batteries or the like.

Certain aspects of the present invention are generally directed to electrochemical devices, and electrodes for use in such electrochemical devices, as well as methods of making and using these. Non-limiting examples of electrochemical devices include batteries, capacitors, sensors, condensers, electrochromic elements, photoelectric conversion elements, or the like. For example, in one set of embodiments, the electrochemical device may be a lithium-ion battery, such as a lithium-ion solid-state battery. For instance, the lithium-ion battery may comprise one or more lithium ion electrochemical cells, wherein some or all of the electrochemical cells has a structure such as is described herein. The electrochemical device may comprise an anode, a cathode, an electrolyte, etc.

In some aspects, the present invention is generally directed to an electrochemical cell, e.g., within an electrochemical device, comprising an electrolyte material such as those discussed herein. Non-limiting examples of electrochemical devices include batteries, capacitors, sensors, condensers, electrochromic elements, photoelectric conversion elements, or the like. In one set of embodiments, the electrochemical device is a battery, e.g., an ion-conducting battery. Non-limiting examples of ion-conducing batteries include lithium-ion conducting batteries, sodium-ion conducting batteries, magnesium-ion conducing batteries, and the like. For instance, the lithium-ion battery may comprise one or more lithium ion electrochemical cells, where some or all of the electrochemical cells has a structure such as is described herein. In some cases, the battery is a solid-state battery. The electrochemical device may also comprise an anode, a cathode, a separator, etc. Many of these are available commercially. An electrolyte as described herein may be used as the electrolyte of the electrochemical device, alone and/or in combination with other electrolyte materials. In some cases, an electrode of the electrochemical device (e.g., an anode or a cathode) may be constructed and arranged as described herein.

For example, in one aspect, the electrode may comprise one or more particles. The particles may comprise, in certain cases, one or more positive electroactive materials. The particles may comprise positive ions such as lithium, sodium, magnesium, or the like. Sodium salts include, but are not limited to: sodium nitrate, sodium acetate, sodium bromide, sodium chloride, sodium perchlorate, sodium hexafluorophosphate, sodium hexafluoroarsenate, sodium trifluoromethanesulfonate, sodium tetrafluoroborate, sodium bis(trifluoromethane)sulfonamide, or the like. Magnesium salts include, but are not limited to, magnesium nitrate, magnesium acetate, magnesium bromide, magnesium chloride, magnesium perchlorate, or the like.

In one set of embodiments, for instance, the particles may comprise lithium, which may be present, for instance, as lithium metal and/or lithium salts. Non-limiting examples include lithium cobalt oxide (LCO), lithium nickel manganese cobalt oxide (NMC) (e.g., $LiNi_{1/3}Co_{1/3}Mn_{1/3}O_2$ or $LiNi_{0.5}Co_{0.2}Mn_{0.3}O_2$), lithium nickel cobalt manganese aluminum oxide, lithium nickel cobalt aluminum oxide, lithium titanate, metallic lithium, lithium metal oxide, lithium cobalt oxide, lithium manganese oxides (LMO) (e.g., $LiMn_2O_4$ and $LiNi_{0.5}Mn_{1.5}O_4$), lithium iron phosphates (LFP) (e.g., $LiFePO_4$), $LiMnPO_4$, $LiCoPO_4$ (LCP), $Li_2Mn_3O_8$, wherein M is Fe and/or Co, layered Li—Ni—Co—Mn oxides, (NCM), layered Li—Ni—Co—Al oxides (NCA), and the like. Combinations of these and/or other compounds are also possible.

As a non-limiting example, the particles may comprise a positive electroactive material that contains various amounts of lithium, nickel, manganese, and cobalt. These may vary independently of each other, e.g., in the formula $Ni_xMn_yCo_z$. In some cases, the sum of x, y, and z is 1, i.e., there are no other ions present within the NMC matrix composition (other than the alkali metal ions, e.g., lithium) other than these three. Thus, z may equal (1−x−y). However, in other cases, the sum of x, y, and z may actually be less than or more than 1, e.g., from 0.8 to 1.2, from 0.9 to 1.1, from 0.95 to 1.05, or from 0.98 to 1.02. Additional example values are discussed below. Thus, the material may be overdoped or underdoped in some cases, and/or contain other ions present in addition to nickel, manganese, and cobalt.

As another example, the positive electroactive material may have a formula of $Li_a(Ni_xMn_yCo_z)O_2$. In some cases, a is a numerical value in a first range between approximately 1.00 and 1.01, x is a numerical value in a second range between approximately 0.34 and 0.58, y is a numerical value in a third range between approximately 0.21 and 0.38, and z is a numerical value in a fourth range between approximately 0.21 and 0.38. Additional example values for each of a, x, y, and z are discussed below.

In another set of embodiments, the positive electroactive material can comprise an electroactive composition that comprises lithium (Li), nickel (Ni), manganese (Mn), and cobalt (Co). The positive electroactive material can further include an element M selected from samarium (Sm), lanthanum (La), zinc (Zn) or combinations thereof. In some embodiments, the composition can have a formula of $Li_aM_b$ $(Ni_xMn_yCo_z)_{1-b}O_2$. In some cases, a may be a numerical value in a first range between approximately 1.00 and 1.01, b is a numerical value in a second range between approximately 0 and 0.08, x is a numerical value in a third range between approximately 0.34 and 0.58, y is a numerical value in a fourth range between approximately 0.21 and 0.38, and z is a numerical value in a fifth range between approximately 0.21 and 0.38. Additional example values for each of a, b, x, y, and z are discussed below.

In any of the structures described above or herein, in some cases, x (e.g., nickel) may be at least 0.5, at least 0.55, at least 0.6, at least 0.65, at least 0.7, at least, 0.75, at least 0.8, at least 0.85, at least 0.9, at least 0.95, etc. In some embodiments, x may be no more than 0.95, no more than 0.9, no more than 0.85, no more than 0.8, no more than 0.75, no more than 0.7, no more than 0.65, no more than 0.6, no more than 0.55, no more than 0.5, etc. In certain embodiments, combinations of any these are possible. For example, x may be between 0.7 and 0.9.

In some cases, y (e.g., manganese) may be at least 0.05, at least 0.1, at least 0.15, at least 0.2, at least 0.25, at least 0.3, at least 0.35, at least 0.4, at least 0.45, at least 0.5, etc. In some embodiments, y may be no more than 0.5, no more than 0.45, no more than 0.4, no more than 0.35, no more than 0.3, no more than 0.25, no more than 0.2, no more than 0.15, no more than 0.1, no more than 0.05, etc. In certain embodiments, combinations of any these are possible. For example, y may be between 0.05 and 0.15.

In some cases, z (e.g., cobalt) may be at least 0.05, at least 0.1, at least 0.15, at least 0.2, at least 0.25, at least 0.3, at least 0.35, at least 0.4, at least 0.45, at least 0.5, etc. In some embodiments, z may be no more than 0.5, no more than 0.45, no more than 0.4, no more than 0.35, no more than 0.3, no more than 0.25, no more than 0.2, no more than 0.15, no more than 0.1, no more than 0.05, etc. In certain embodiments, combinations of any these are possible. For example, z may be between 0.05 and 0.15.

In some cases, a (e.g., lithium) may be at least 0.95, at least 0.96, at least 0.97, at least 0.98, at least 0.99, at least 1.00, at least 1.01, at least 1.02, at least 1.03, at least 1.04, at least 1.05, etc., and/or no more than 1.05, no more than 1.04, no more than 1.03, no more than 1.02, no more than 1.01, no more than 1.00, no more than 0.99, no more than 0.98, no more than 0.97, no more than 0.96, no more than 0.95, etc. Combinations of any of these may also be possible, e.g., a may be between 0.99 and 1.03.

In some cases, b may be at least 0.01, at least 0.02, at least 0.03, at least 0.04, at least 0.05, at least 0.06, at least 0.07, at least 0.08, at least 0.09, at least 0.1, etc. In some embodiments, b may be no more than 0.1, no more than 0.09, no more than 0.08, no more than 0.07, no more than 0.06, no more than 0.05, no more than 0.04, no more than 0.03, no more than 0.02, no more than 0.01. b may also be 0 in some cases. Combinations of any of these may also be possible, e.g., a may be between 0.07 and 0.09.

Additional examples of positive electroactive materials can be seen in Int. Pat. Apl. Pub. No. WO 2018/112182, entitled "Electroactive Material for Lithium-Ion or other Batteries," or Int. Pat. Apl. Pub. No. WO 2017/053275, entitled "Nickel-Based Positive Electroactive Materials," each of which is incorporated herein by reference in its entirety.

In certain cases, the particle size (or size distribution) may be determined using D50. The D50 of a plurality of particles is the particle diameter that is larger than fifty (50) percent of the total particle (often denoted as the median number or the mass-median-diameter of the particles, e.g., in a lognormal distribution). The D50 is thus a measure of the average particle diameter, as determined by mass. Equipment for determining the D50 of a sample can be readily obtained commercially, and can include techniques such as sieving or laser light scattering. It should be noted that although D50 generally refers to the average particle diameter, this does not imply that the particles necessarily must be perfectly spherical; the particles may also be non-spherical as well in some embodiments.

In certain cases, the D50 may be at least about 3 micrometers, at least about 3.5 micrometers, at least about 4 micrometers, at least about 4.5 micrometers, at least about 5 micrometers, at least about 5.5 micrometers, at least about 6 micrometers, at least about 6.5 micrometers, at least about 7 micrometers, at least about 7.5 micrometers, at least about 7.8 micrometers, at least about 8 micrometers, at least 9 micrometers, at least 10 micrometers, at least 11 micrometers, at least 12 micrometers, at least 13 micrometers, at least 14 micrometers, at least 15 micrometers, at least 16 micrometers, at least 17 micrometers, at least 18 micrometers, at least 19 micrometers, at least 20 micrometers, etc. In addition, the D50 may be no more than 20 micrometers, no more than 19 micrometers, no more than 18 micrometers, no more than 17 micrometers, no more than 16 micrometers, no more than 15 micrometers, no more than 14 micrometers, no more than 13 micrometers, no more than 12 micrometers, no more than 11 micrometers, no more than 10 micrometers, no more than about 9 micrometers, no more than about 8.5 micrometers, no more than about 8 micrometers, no more than about 7.8 micrometers, no more than about 7.5 micrometers, no more than about 7 micrometers, no more than about 6.5 micrometers, no more than about 6 micrometers, no more than about 5.5 micrometers, no more than about 5 micrometers, no more than about 4.5 micrometers, or no more than about 4 micrometers. Combinations of any of these are also possible in additional embodiments; for instance, the D50 may be from about 4.0 micrometers to about 7.8 micrometers, or from 10 micrometers to 13 micrometers, etc.

The shape/size of the particles may also be determined, in accordance with certain embodiments, by measuring their tap density. The tap density is equal to the sample's mass/volume after a compaction process, typically involving tapping of the sample (for example, 3,000 times) to settle the particles. The tap density is thus a function of both the shape of the particles (how well the particles fit together into a compacted sample, despite any irregularities in shape) and the sizes of the particles (larger particles typically will not be able to pack closely together as readily, resulting in a lower tap density).

Accordingly, tap density is a practical general measure of the relative size, shape, and/or uniformity of the particles, without necessarily requiring in-depth or microscopic analysis of the particles. It should be understood that tap density is to be distinguished from techniques that involve compressing or crushing the particles (e.g., into a homogenous mass), as doing so does not preserve the shape of the particles; such techniques would be a measure of the bulk density of the material, not the density of the individual particles. In addition, it should be understood that tap density is not a straightforward function of the size of the particles, and the tap density cannot be calculated using their average diameter or D50 measurements (e.g., by assuming that the particles are perfect spheres in a face-centered cubic packing), as to do so would ignore the shape distribution and uniformity of the particles.

Mechanical tapping is typically used to determine tap density, e.g., by repeatedly raising a contained containing material and allowing it to drop, under its own mass, a specified, relatively short distance. This may be done multiple times, e.g., hundreds or thousands of times, or until no further significant changes in volume are observed (e.g., since the particles have maximally settled within the sample). In some cases, devices that rotate the material instead of tapping may be used. Standardized methods of determining tap density include, for instance, ASTM methods B527 or D4781. Equipment for determining the tap density of a sample (e.g., for automatic tapping) can be easily acquired from commercial sources; see, e.g., Example 4. Without wishing to be bound by any theory, it is believed that a greater tap density allows a larger quantity of positive electroactive material to be stored in a limited or specific volume, thereby resulting in a higher volumetric capacity or improved volumetric energy density.

In one set of embodiments, the particles have a tap density of at least 2.00 g/cm$^3$, at least 2.10 g/cm$^3$, at least 2.20 g/cm$^3$, at least 2.30 g/cm$^3$, or at least 2.40 g/cm$^3$. In addition, the tap density may be no more than about 2.50 g/cm$^3$, no more than about 2.40 g/cm$^3$, no more than about 2.30 g/cm$^3$, no more than about 2.20 g/cm$^3$, or no more than about 2.10 g/cm$^3$. Combinations of any of these are also possible in various embodiments; for example, the particles of the present invention may have a tap density of 2.00 to 2.40 g/cm$^3$.

In some cases, the electrode may exhibit an ionic conductivity of at least $1 \times 10^{-4}$ S/cm, at least $3 \times 10^{-4}$ S/cm, or at least $1 \times 10^{-3}$ S/cm. In some cases, the electrode may exhibit a decomposition potential of at least 3 V, at least 3.5 V, at least 4.0 V, at least 4.5 V, at least 5.0 V, at least 5.3 V, at least 5.5 V, or at least 6 V.

As mentioned, the particles may be spherical and/or non-spherical, and may be the same or different sizes in various aspects. However, it will be understood that, as the packing of particles is not perfect, there will be an interstitial volume of space created present between the particles, regardless of how tightly or loosely they are packed together, and may include interstices, pores, gaps, etc., or other irregularities in packing. Thus, for example, the particles may be packed together to form a relatively porous electrode.

In some cases, the interstitial volume of space may be at least partially filled with an electrolyte, such as a solid electrolyte. The electrolyte is discussed in more detail herein. However, the entire interstitial volume need not be completely filled with electrolyte. For example, in some embodiments, at least 30 vol %, at least 40 vol %, at least 50 vol %, at least 60 vol %, at least 70 vol %, at least 75 vol %, at least 80 vol %, at least 85 vol %, at least 90 vol %, at least 95 vol %, or about 100 vol % of the interstices between the particles may comprise an electrolyte. In addition, the electrolyte may be substantially distributed within the interstitial volume in certain cases. For example, in some cases, at least 30%, at least 40%, at least 50%, at least 60%, at least 70%, at least 75%, at least 80%, at least 85%, at least 90%, at least 95%, or about 100% of the particles may be in physical contact with the electrolyte.

In some embodiments, the electrolyte within the interstitial volume of the electrode may form at least 5 wt %, at least 10 wt %, at least 15 wt %, at least 20 wt %, at least 25 wt %, at least 30 wt %, at least 35 wt %, at least 40 wt %, at least 45 wt %, or at least 50 wt % of the electrode. In addition, the solid electrolyte within the interstitial volume of the electrode may form no more than 50 wt %, no more than 45 wt %, no more than 40 wt %, no more than 35 wt %, no more than 30 wt %, no more than 25 wt %, no more than 20 wt %, no more than 15 wt %, no more than 10 wt %, or no more than 5 wt % of the electrode. In addition, combinations of these are also possible; for instance, the electrolyte may form between 10 wt % and 40 wt % of the electrode.

Such volumes or distributions of electrolyte within an electrode may be determined, for example, using various techniques known to those of ordinary skill in the art, such as SEM. One non-limiting example of such a technique is described in Example 7.

Without wishing to be bound by any theory, it is believed that the interpenetration of the electrolyte into the interstitial volume within the electrode may allow surprisingly high capacities of the electrode to be reached. This may be because of the shorter distance between the electrode and electrolyte materials, e.g., for ionic current, since ions (e.g., Li ions) need not penetrate as much electrode material to reach the electrolyte. In some cases, for example, an electrode having structures such as those described herein may be able to achieve design capacities of at least 30%, at least 40%, at least 50%, at least 60%, at least 70%, at least 75%, at least 80%, at least 85%, at least 90%, at least 95%, or about 100%. The design capacity may be determined as the theoretical capacity, based on the mass of electrode material that is present, of charge that can held by the electrode, i.e., the design capacity is the capacity of the material if all of the electrode material participated in ion exchange with the electrolyte. It can be calculated based on the weight of electrode material that is present and the specific capacity of the electrode material.

A variety of materials may be used as the solid electrolyte, in various aspects of the invention. For example, in one set of embodiments, the solid electrolyte may comprise one or more polymers. In some cases, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 90 wt %, or about 100 wt % of the electrolyte may be polymer.

In some cases, the polymer may be a co-polymer. The molecular weight of the polymer is not particularly limited, and may be any of a broad range of molecular weights. For example, the molecular weight may be at least 100, at least 200, at least 300, at least 500, at least 1,000, at least 3,000, at least 10,000, at least 30,000, at least 100,000, at least 300,000, at least 1,000,000, etc. In some cases, the molecular weight may be no more than 10,000,000, no more than 3,000,000, no more than 1,000,000, no more than 300,000, no more than 100,000, no more than 30,000, no more than 10,000, no more than 3,000, no more than 1,000, no more than 500, no more than 300, etc. Combinations of any of these are also possible e.g., the molecular weight may be between 200 and 1,000. The molecular weight may be determined as a number average molecular weight.

In some cases, the polymer may be a conducting polymer. The polymer may also have various structures (e.g., secondary structures); for example, the polymer may be amorphous, crystalline, or a combination thereof. In some embodiments, the polymer may have a relatively high ion conductivity (e.g., greater than $10^{-5}$ S/cm$^2$), and a relatively low electron conductivity (e.g., less than $10^{-5}$ S/cm$^2$).

In some embodiments, the polymer may have low crystallinity. For example, the crystallinity may be less than 70%, less than 60%, less than 50%, less than 40%, or less than 30%. The crystallinity can be measured, for example, using DSC by comparing the exothermic energy of the crystallization process for a semicrystaline polymer with the energy of prefect crystal which is calculated based on the crystallization.

In some cases, the polymer may include one or more of poly(ethylene) (PE), poly(ethylene oxide) (PEO), poly(propylene) (PP), poly(propylene oxide), poly(methyl methacrylate) (PMMA), polyacrylonitrile (PAN), poly(bis(methoxy ethoxyethoxide)phosphazene), poly(dimethylsiloxane) (PDMS), cellulose, cellulose acetate, cellulose acetate butylate, cellulose acetate propionate, polyvinylidene difluoride (PVDF), polyvinylpyrrolidone (PVP), polystyrene sulfonate (PSS), polyvinylchloride (PVC), poly(vinylidene chloride) polypropylene oxide, polyvinylacetate, polytetrafluoroethylene (PTFE), poly(ethylene terephthalate) (PET), polyimide, polyhydroxyalkanoate (PHA), poly(acrylonitrile-co-methylacrylate). In some cases, the polymer can comprise a PEO containing co-polymer, such as polystyrene (PS)-PEO copolymer, poly(methvlmethacrylate) (PMMA)-PEO copolymer, or the like. Derivatives of any of these may also be included.

Certain embodiments of the invention are generally directed to polymers having functional groups such as urea and/or carbamate moieties within the polymer, e.g., within the backbone structure of the polymer. In some cases, the urea and/or carbamate moieties may be crosslinked together, and/or to other polymers, e.g., as described herein. For example, in some embodiments, groups such as urea, urethane, or carbamate may be present in the backbone of the polymer, for example, as a linker between a middle polymeric fragment and two acrylic ends. The urea and/or carbamate may be provided within the polymer using different combinations of functional groups, such as amine and carbamate, or alcohol and isocyanate, during formation of the polymer. Such groups may be present next to each other, and/or some of the groups may be separated by spacer groups, e.g., between the urea and/or carbamate, and an acrylate.

Non-limiting examples of polymers containing urea and/or carbamate moieties include polymers formed from polymerization reactions comprising one or more of the following monomers:

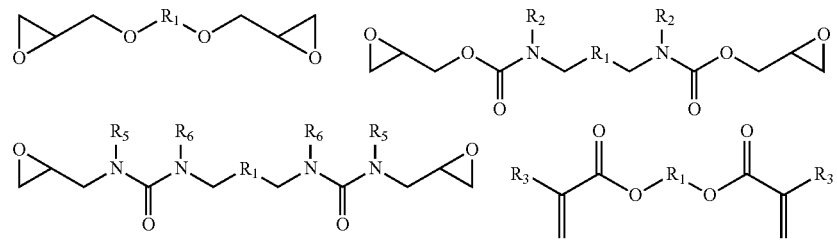

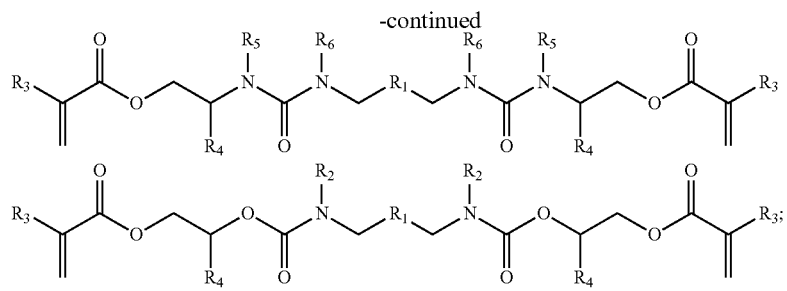

In these structures, $R_1$ may be selected to allow complexation with salts or ions, e.g., to produce a polymer/salt complex that can act as an electrolyte. For example, $R_1$ may include charged moieties, and/or moieties that are uncharged but are readily ionizable to produce a charge, e.g., at acidic or alkaline pH's (for instance, at pH's of less than 5, less than 4, less than 3, or less than 2, or greater than 9, greater than 10, greater than 11, or greater than 12). Specific examples of $R_1$ include, but are not limited to, the following (where * indicates a point of attachment):

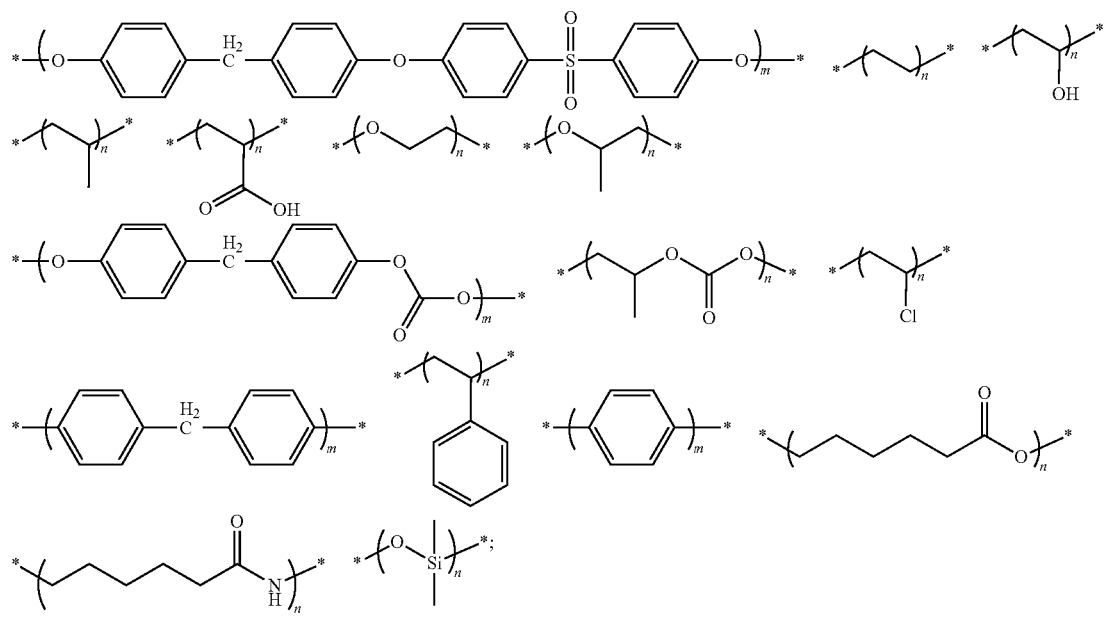

In addition, in some cases, 2, 3, 4, or more of these may be present simultaneously within the $R_1$ structure, e.g., as copolymers. For example, they may be present in alternating, block, random or other copolymer structures to define the $R_1$ moiety. In some cases, 2, 3, 4, or more polymers may be present, and in some cases may be crosslinked together, e.g., as discussed herein.

In these structures n and/or m (as applicable) may each be an integer. In some cases, n and/or m may each be less than 100,000, less than 50,000, less than 30,000, less than 10,000, less than 5,000, less than 3,000, less than 1,000, less than 500, etc. In certain cases, n and/or m may be at least 1, at least 3, at least 5, at least 10, at least 30, at least 50, at least 100, at least 300, at least 500, at least 1,000, at least 3,000, at least 5,000, at least 10,000, at least 30,000, at least 50,000 etc. Combinations of any of these ranges are possible; as non-limiting examples, n may be an integer between 1 and 10000, m may be an integer between 1 and 5000, n may be an integer between 1000 and 5000, m may be an integer between 500 and 1000, etc.

In these structures $R_2$, $R_3$, $R_4$, $R_5$, and $R_6$ may each be independently chosen (as applicable) to make the polymers symmetric or non-symmetric. Examples of $R_2$, $R_3$, $R_4$, $R_5$, and $R_6$ include, but are not limited to, one of the following structures:

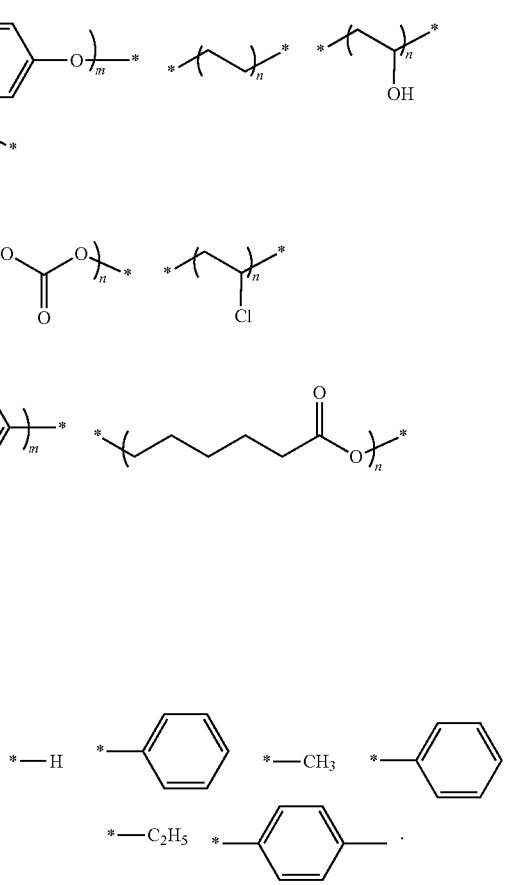

Other examples of $R_2$, $R_3$, $R_4$, $R_5$, and $R_6$ include, but are not limited to, an acrylate, an ethylene oxide, an epoxy ethyl group, an isocyanates, a cyclic carbonate, a lactone, a lactams, a vinyl group ($CH_2$=CH—), or a vinyl derivative (i.e., where 1, 2, or 3 of the H's in the $CH_2$=CH— structure have been replaced by an F or a Cl). Non-limiting examples of cyclic carbonates include ethylene carbonate, propylene carbonate, fluoroethylene carbonate, etc. In addition, it should be understood that these endgroups are provided by way of example only. In general, the endgroups are not critical, as they typically would not affect performance in a significant way.

In addition, in one set of embodiments, functional groups such as urea and/or carbamate may be crosslinked together, e.g., as described herein. For example, such functional groups may be crosslinked together using UV light, thermoforming or exposure to elevated temperatures (e.g., between temperatures of 20° C. and 100° C.), or other methods including those described herein. In some cases, the incorporation of urea or carbamate functional groups can improve mechanical properties, electrochemical performances, or the like, such as relatively high ionic conductivities, ion transference numbers, decomposition voltages, tensile strength, or the like.

Additional examples of solid electrolyte polymers can be seen in U.S. patent application Ser. No. 16/240,502, entitled "Polymer Solid Electrolyte," and a U.S. patent application filed on even date herewith, entitled "Electrolytes for High-Voltage Cathode Materials and Other Applications," each incorporated herein by reference in their entireties.

In one set of embodiments, the solid electrolyte has a molar ratio of the polymer to a crosslinkable oligomer that is at least 1:5, at least 1:4, at least 1:3, at least 1:2, at least 1:1.5, at least 1:1, at least 1:0.7, at least 1:2/3, at least 1:0.5, etc. In some cases, the molar ratio may be no more than 1:0.2, no more than 1:0.5, no more than 1:0.7, no more than 1:1, no more than 1:2, no more than 1:3, no more than 1:4, or no more than 1:5. Combinations of these are possible in some cases, e.g., the molar ratio may be between 1:4 and 3:2. Without wishing to be bound by any theory, if the polymer concentration is too high, the solid electrolyte may be relatively soft, which could be harder to handle; however, If the crosslinkable oligomer concentration is too high, the solid electrolyte may be very tough, easy to break during handling, and may not provide good adhesion.

In one set of embodiments, the polymer solid electrolyte may include a plasticizer, which may be useful for improve processability of the polymer solid electrolyte, and/or controlling the ionic conductivity and mechanical strength. For example the plasticizer may be a polymer, a small molecule (i.e., having a molecular weight of less than 1 kDa), a nitrile, an oligoether (e.g., triglyme), cyclic carbonate, ionic liquids, or the like. Non-limiting examples of potentially suitable plasticizers include ethylene carbonate, succinonitrile, sulfolane, phosphate, or the like. Non-limiting examples of nitriles include succinonitrile, glutaronitrile, hexonitrile, and/or malononitrile. Non-limiting examples of cyclic carbonate include ethylene carbonate, propylene carbonate, fluoroethylene carbonate, etc. Non-limiting examples of ionic liquids include N-propyl-N-methylpyrrolidinium bis(fluorosulfonyl)imide or 1-ethyl-3-methylimidazolium bis(fluorosulfonyl)imide. Other non-limiting examples of plasticizers include polymers such as polyethylene oxide, a polycarbonate, a polyacrylonitrile, a polylactic acid, or the like. In some cases, the plasticizer may be a polymer that is relatively hydrophilic, e.g., having a water contact angle of less than 90°. In addition, the polymer may be free of sulfur.

In one set of embodiments, the solid electrolyte may have a molar ratio of (polymer+crosslinkable oligomer) to plasticizer that is at least 1:0.2, at least 1:0.5, at least 1:1, at least 1:1.5, at least 1:2, at least 1:3, at least 1:5, and/or a ratio that is no more than 1:5, no more than 1:3, no more than 1:2, no more than 1:1.5, no more than 1:1, no more than 1:0.5, or no more than 1:0.2, Combinations of any of these are also possible, e.g., the ratio of (polymer+crosslinkable oligomer) to plasticizer may be between 2:1 and 1:2.

In addition, as discussed, more than one polymer may be present, e.g., as a physical blend and/or as a copolymer, etc., including any combination of these polymers, and/or other polymers.

The solid electrolyte may also contain additives or other components, in certain aspects. For example, in some embodiments, an electrolyte salt may be present. These may include alkali metal salts, such as lithium, sodium, or magnesium salts. Specific non-limiting examples of lithium salts include LiTFSI, LiFSI, LiBOB, $LiPF_6$, $LiBF_4$, $LiClO_4$, $LiAsF_6$, $LiN(CF_3SO_2)_2$, $LiC(CF_3SO_2)_3$, LiDFOB, LiF, LiCl, LiBr, LiI, $Li_2SO_4$, $LiNO_3$, $Li_3PO_4$, $Li_2CO_3$, LiOH, lithium acetate, lithium trifluoromethyl acetate, lithium oxalate, etc. Other examples include, but are not limited to, quaternary ammonium salts, quaternary phosphonium salts, transition metal salts, or salts of protonic acids. Non-limiting examples of protonic acids include dimethyldioctadecylammonium chloride, tetraphenylphosphonium chloride, cobalt sulfate, lithium sulfate, etc.

In some cases, the electrolyte salt such as those described herein can be present at a concentration of at least 1 M, at least 2 M, at least 3 M, at least 4 M, at least 5 M, at least 6 M, at least 7 M, at least 8 M, at least 9 M, at least 10 M, and/or no more than 10 M, no more than 9 M, no more than 8 M, no more than 7 M, no more than 6 M, no more than 5 M, no more than 4 M, no more than 3 M, no more than 2 M, no more than 1 M, etc. Combinations of any of these are also possible in some embodiments, e.g., the electrolyte salt may be present at between 1 M and 3 M.

In addition, other compounds may also be present, such as cathode protective agents, anode protective agents, anti-oxidative agents, inorganic additive, etc. Non-limiting examples of inorganic additives include $Al_2O_3$, $SiO_2$, $SiO_x$, $TiO_2$, $Li_3PS_4$, $Li_{10}GeP_2S_{12}$, $Li_7La_3Zr_2O_{12}$, $Li_{6.4}La_3Zr_{1.4}Ta_{0.6}O_{12}$, $LiLaTiO_3$, $Li_{1.3}Al_{0.3}Ti_{1.7}(PO_4)_3$, $Li_{1.3}Al_{0.3}Ge_{1.7}(PO_4)_3$, etc. An example of a cathode protective agent is LiDFOB (lithium difluoro(oxalato)borate). An example of an anode protective agent is fluoroethylene carbonate. An example of an anti-oxidative agent is LiBOB (lithium bis(oxalate)borate). Other similar compounds will be known by those of ordinary skill in the art. These may be added for a variety of reasons, e.g., to improve other performance metrics, such as cyclability. In some cases, an inorganic additive may be used that contains generally electronegative atoms such as oxygen, which may attract cations. Thus, for example, ions such as $Li^+$ can be relocated relatively more easily than the anions.

In another set of embodiments, the solid electrolyte may contain an organic carbonate additive. Without wishing to be bound by any theory, in addition to a less-resistive solid electrolyte interphase (SEI), an organic carbonate can significantly enhance the wettability of electrodes in the corresponding electrolytes, which may improve battery performance to achieve higher capacities, in comparison with electrolytes without any organic carbonates additives. For example, organic carbonates may exhibit stability at negative potentials. In some cases, organic carbonates can extend the electrochemical stability of the electrolyte towards negative potentials. A small amount of organic carbonate can significantly improve the battery performance of the polymer solid electrolyte, e.g., because the presence of organic additives may increase ionic mobility by lowering lithium coordination, while the electrolyte is still non-flammable.

Non-limiting examples of organic carbonates additives include ethylene carbonate (EC), vinylene carbonate (VC), fluoroethylene carbonate (FEC), methylene-ethylene carbonate (MEC), 1,2-dimethoxyethane carbonates (DME), diethylene carbonate (DEC), (4R,5S)-4,5-difluoro-1,3-dixolan-2-one (DiFEC). More than one organic carbonate additive, including these and/or other additives, are also possible. The organic carbonate may be present at no more than 15 wt %, no more than 10 wt %, no more than 5 wt %, etc. of the solid electrolyte.

In one set of embodiments, the electrolyte further comprises a stabilization additive. Non-limiting examples of stabilization additives include lithium bis(oxalato)borate (LiBoB) or LiBF$_4$, etc. In one set of embodiments, the stabilization additive may be present at no more than 0.3 wt %, no more than 0.2 wt %, no more than 0.1 wt %, etc. Without wishing to be bound by any theory, stabilization additives may be useful in certain embodiments for sustaining the voltage of the polymer electrolyte; as a non-limiting example, an electrolyte may not be able to sustain a voltage above 3.9 V, but could sustain a voltage of at least 4.4 V with a stabilization additive.

In some embodiments, the electrolyte may further comprise an initiator, such as a stabilization initiator. Non-limiting examples include benzoyl peroxide, 2,2'-azobisisobutyronitrile (AIBN), 4,4-azobis (4-cyanovaleric acid) (ACVA), potassium persulfate, or the like. Other examples include Irgacure initiator, 2,2'-azobis(2-methylpropionitrile), ammonium persulfate, or other initiators known to those of ordinary skill in the art. In some embodiments, the initiator may be used to initiate the crosslink reactions within the polymer, or to otherwise facilitate polymerization. Those of ordinary skill in the art will know of other initiators that can be used, in addition and/or in combination with these. Many initiators are readily obtainable commercially. In one set of embodiments, the initiator may be present at no more than 0.3 wt %, no more than 0.2 wt %, no more than 0.1 wt %, etc. In some cases, the initiator may be added to have a mole fraction between 0.001 and 0.01, or other suitable mole fractions to facilitate polymerization.

Certain embodiments include an ion dissociation compound. The ion dissociation compound can be an organic compound. In some embodiments, the ion dissociation compound can dissociate ion pairs present in solution (such as lithium ions from a lithium NMC compound), and in some cases, form a chemical complex with an ion from the ion pair (e.g., such as with a lithium ion). Non-limiting examples of ion dissociation compounds include flame retardants, phosphates including organophosphates, sulfones, polar aprotic solvents, or the like.

In certain embodiments, an ion dissociation compound is present in an electrolyte within an electrochemical device. Without wishing to be bound by any theory, it is believed that the ion dissociation compound is one that can help release ions, such as those bound to ion pairs (for example, lithium ions from a lithium NMC compound), and allow the ions to enter solution. This may, for example, allow more ions to participate in charging/discharging of the electrochemical device, which can lead to improvements such as electrolytes with improved oxidation potentials, increased ionic conductivities, higher flash points, or higher working temperatures, etc., as discussed below. A variety of compounds may be used as the ion dissociation compound. In some case, the ion dissociation compound is an organic compound. Examples of ion dissociation compounds include, but are not limited to, flame retardants, phosphates including organophosphates, sulfones, polar aprotic solvents, or the like.

Additional non-limiting examples of ion dissociation compounds suitable for use with electrolytes include those discussed in a U.S. patent application filed on even date herewith, entitled "Electrolytes for High-Voltage Cathode Materials and Other Applications," incorporated herein by reference in its entirety.

For example, in some embodiments, the electrolyte may further comprise a flame retardant, e.g., as an ion dissociation compound. Non-limiting examples of suitable flame retardant include nitrogen-containing flame retardants, silicon-containing flame retardants, fluorine-containing flame retardants (e.g., methyl difluoroacetate, and difluoroethyl acetate), composite flame-retardant additives, organophosphorus flame retardants (for example, trialkyl phosphate, such as triethyl phosphate, trimethyl phosphate), or the like. In one set of embodiments, the flame retardant may be present at no more than 0.3 wt %, no more than 0.2 wt %, no more than 0.1 wt %, etc.

In some embodiments, the electrolyte may further comprise a sulfone, e.g., as an ion dissociation compound. The sulfone may have a structure $R^2$—$SO_2$—$R^1$, where the R's may be the same or different. Each R may be, for example, a hydrocarbon chain, such as an alkyl (substituted or unsubstituted), an alkenyl (substituted or unsubstituted), an alkynyl (substituted or unsubstituted), or the like. Specific non-limiting examples of sulfones include divinyl sulfone, allyl methyl sulfone, butadiene sulfone, or ethyl vinyl sulfone. In some cases, sulfones such as these can also be used as crosslinking agents, e.g., since they contain double bonds, e.g., for radical polymerizations. Additional examples of sulfones include, but are not limited to, dimethyl sulfone, diphenyl sulfone, methyl phenyl sulfone, isopropyl sulfone, trimethylene sulfone, tetramethylene sulfone, diethyl sulfone, ethyl methyl sulfone, or the like. In one set of embodiments, the sulfone may be present at no more than 0.3 wt %, no more than 0.2 wt %, no more than 0.1 wt %, etc.

In some embodiments, the electrolyte may further comprise a phosphine-based additive. Non-limiting examples of phosphine-based additives include hexafluoroisopropyl triphosphate, triisopropyl ethylsulfonyl (pentafluorophenyl) phosphine, or the like. In one set of embodiments, the phosphine-based additive may be present at no more than 0.3 wt %, no more than 0.2 wt %, no more than 0.1 wt %, etc.

In some embodiments, the electrolyte may further comprise an ether additive. An ether additive may be a linear polymer which helps with ion transport. For example, the ether additive may increase the conductivity of the solid electrolyte. Non-limiting examples of ether additives include hydrofluoroether, 1,1,2,2-tetrafluoroethyl 2,2,3,3-tetrafluoropropyl ether, bis(2,2,2-trifluoroethyl) ether, oligo ethylene glycol methyl ether, tetraethylene glycol dimethyl ether, bis(2,2,2-trifluoroethyl) ether, oligo ethylene glycol methyl ether, etc. In one set of embodiments, the ether additive may be present at no more than 0.3 wt %, no more than 0.2 wt %, no more than 0.1 wt %, etc.

In some cases, the electrolyte may be preparing using a solvent in accordance with certain embodiments. The solvent may be used during processing, although it may not necessarily appear in the final product. Non-limiting examples of solvents include $CH_2Cl_2$, tetrahydrofuran (THF), dimethyl carbonate (DMC), ethylene carbonate (EC), diethyl carbonate (DEC), dimethoxyethane (DME), dioxolane (DOL), N-propyl-N-methylpyrrolidinium bis(trifluoromethanesulfonyl) imide, or the like. In one set of embodiments, the solvent may be present at no more than 0.3 wt %, no more than 0.2 wt %, no more than 0.1 wt %, etc.

In some embodiments, at least some of the electrolyte is present as a layer on a surface of the electrode. For example, an electrolyte layer such as those described herein may be relatively thick. For instance, the thickness of the electrolyte layer may be at least 20 micrometers, at least 30 micrometers, at least 40 micrometers, at least 50 micrometers, at least 60 micrometers, at least 70 micrometers, at least 80 micrometers, at least 90 micrometers, at least 100 micrometers, at least 200 micrometers, at least 300 micrometers, at least 400 micrometers, at least 500 micrometers, at least 600 micrometers, at least 700 micrometers, at least 800 micrometers, at least 900 micrometers, at least 1000 micrometers, etc. In addition, the electrolyte layer may be less than 1000 micrometers, less than 900 micrometers, less than 800 micrometers, less than 700 micrometers, less than 600 micrometers, less than 500 micrometers, less than 400 micrometers, less than 300 micrometers, less than 200 micrometers, less than 100 micrometers, less than 90 micrometers, less than 80 micrometers, less than 70 micrometers, less than 60 micrometers, less than 50 micrometers, less than 40 micrometers, less than 30 micrometers, less than 20 micrometers, less than 10 micrometers, etc. Combinations of any of these are also possible, e.g., the electrolyte may have a thickness of between 50 micrometers and 100 micrometers. The thickness can be determined using techniques known to those of ordinary skill in the art, such as SEM. Without wishing to be bound by any theory, the electrolyte layer may suppress dendrite growth within the electrochemical device. The electrolyte layer may be relatively smooth and flat, which may enhance contact between the electrode material and the electrolyte, and/or suppress or slow dendrite growth.

In one set of embodiments, the electrode may further comprise a support structure disposed on at least a portion of a surface of the electrode. The support structure may be used to allow migration of ions to the electrode from the electrolyte. In some cases, the support structure may help control and decrease the thickness of the solid electrolyte. The support structure may not substantially impede ion transport, although it may allow a thinner electrode to be used. The support structure may have any suitable porosity, e.g., that does not substantially impede ion transport. For example, the pores may be much larger than the ions.

For example, the support structure may be a film (for example, a porous organic or inorganic film), or a fabric (e.g., a non-woven fabric). Non-limiting examples of non-woven fabrics include polyolefin-based porous film, poly (vinylidene fluoride) (PVDF), poly (vinylidene fluoride-co-hexafluoropropylene) (PVDF-co-HFP), comprises polyacrylonitrile (PAN), polyethylene terephthalate (PET), etc.

In some embodiments, the support structure may comprise inorganic particles. For example, the support structure may comprise particle-coated composite membranes, particle-filled composite membranes, particle-filled non-woven mats, or the like. Various kinds of particles can be used. Non-limiting examples of particles include $BaTiO_3$, $ZrO_2$, $Al_2O_3$, $TiO_2$, $SiO_2$, $BaCO_3$, $LiAlO_2$, $MgO$, or the like. The membranes comprising such particles may exhibit porous structures with well-connected interstitial voids between the particles, which can allow for the suitable migration of ions.

In some cases, the particles can have an average diameter of at least 40 nm, at least 50 nm, at least 60 nm, at least 75 nm, at least 100 nm, at least 150 nm, at least 200 nm, at least 250 nm, at least 300 nm, at least 350 nm, at least 400 nm, at least 450 nm, at least 500 nm, etc. In some cases, the inorganic nanoparticles can have an average diameter of no more than 550 nm, no more than 530 nm, no more than 500 nm, no more than 450 nm, no more than 400 nm, no more than 350 nm, no more than 300 nm, no more than 250 nm, no more than 200 nm, no more than 150 nm, no more than 100 nm, no more than 50 nm, etc. Combinations of any of these are also possible, e.g., the particles may exhibit an average diameter of between 40 nm and 530 nm. The particles may also be spherical or non-spherical.

In certain embodiments, one or more sides of the support structure may be coated with a coating layer, e.g., to form a composite membrane such as described above. For example, in some embodiments, the coating layer is a ceramic-coated layer. The coating layer may comprise components such as $SiO_2$ nanoparticles, $Al_2O_3$ nanoparticles, $CaCO_3$ nanoparticles, silica tubes or particles, or the like. In addition, binders may be present, such as PVDF-HFP or polytetrafluoroethylene (PTFE) binders.

Figure 7:
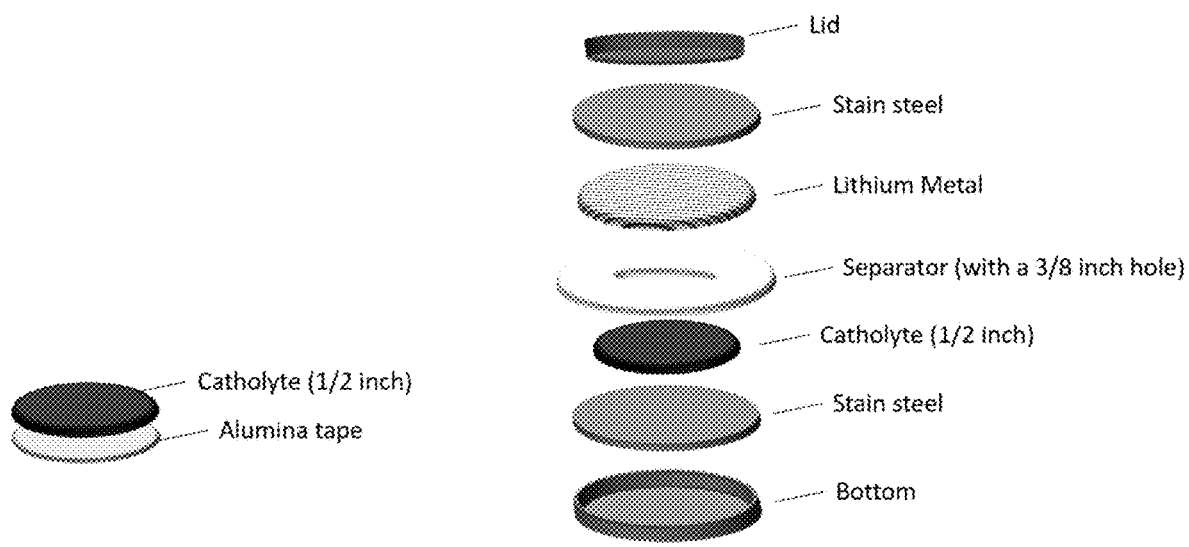
FIG. 7 illustrates a protective apparatus in accordance with certain embodiments of the disclosure.

In one set of embodiments, the electrode comprises a protective apparatus. The protective apparatus may inhibit or reduce the possibility of short-circuit caused by an electrolyte not adequately covering the electrode. For example, in one embodiment, the protective apparatus comprises a rubber ring. In certain embodiments, the diameter of the rubber ring is bigger than the diameter of the electrode. An example of a protective apparatus is shown in FIG. 7. However, it should be understood that the protective apparatus is optional.

In one aspect, electrodes such as those described herein may be used as a cathode within an electrochemical device. The electrode may also comprise a suitable anode.

The anode material may be a conducting material. For example, the anode may comprise a conducting carbon material, such as graphite, hard carbon, porous hollow carbon spheres and tubes, and the like. Other non-limiting examples of conducting materials include conducting carbon materials, tin and its alloys, tin/carbon, tin/cobalt alloys, silicon/carbon materials, and the like. Non-limiting examples of conducing carbon materials include graphite, hard carbon porous hollow carbon spheres and tubes (e.g., carbon nanotubes), and the like. As other examples, the anode may comprise silicon, tin, carbon, phosphorous, or the like. A wide variety of anodes and anode materials may be obtained commercially.

The anode may be a metal in some embodiments. Non-limiting examples of metals include lithium metal, sodium metal, magnesium metal, and the like. Lithium (Li) metal is a promising anode material, e.g., for high-energy-density storage systems, because of its high specific capacity (3860 mA h g−1) and low reduction potential (−3.04 V) versus the standard hydrogen electrode.

In one embodiment, the anode may comprise a lithium ion-conducting material, such as lithium metal, lithium carbide, $Li_6C$, a lithium titanate (e.g., $Li_4Ti_5O_{12}$), or the like. In another embodiment, the anode material may comprise a sodium-ion-conducting material, such as sodium metal, $Na_2C_8H_4O_4$, $Na_{0.66}Li_{0.22}Ti_{0.78}O_2$, or the like. In yet another embodiment, the anode material may comprise a magnesium ion-conducting material, such as magnesium metal.

In addition, certain aspects of the present invention are generally directed to electrodes and/or electrochemical devices with improved properties. For instance, in some cases, an electrode such as those described herein may exhibit certain beneficial properties, such as surprisingly high ionic conductivities, compared to other electrodes. For instance, in certain embodiments, an electrode may exhibit ionic conductivities of at least $10^{-8}$ S/cm, at least $2\times10^{-8}$ S/cm, at least $3\times10^{-8}$ S/cm, at least $5\times10^{-8}$ S/cm, at least $10^{-7}$ S/cm, at least $2\times10^{-7}$ S/cm, at least $3\times10^{-7}$ S/cm, at least $5\times10^{-7}$ S/cm, at least $10^{-6}$ S/cm, at least $2\times10^{-6}$ S/cm, at least $3\times10^{-6}$ S/cm, at least $5\times10^{-6}$ S/cm, at least $10^{-5}$ S/cm, at least $2\times10^{-5}$ S/cm, at least $3\times10^{-5}$ S/cm, at least $5\times10^{-5}$ S/cm, at least $10^{-4}$ S/cm, at least $0.8\times10^{-4}$, at least $1.1\times10^{-4}$, at least $1.2\times10^{-4}$, at least $1.4\times10^{-4}$, at least $1.6\times10^{-4}$, at least $2\times10^{-4}$ S/cm, at least $3\times10^{-4}$ S/cm, at least $5\times10^{-4}$ S/cm, at least $10^{-3}$ S/cm, at least $2\times10^{-4}$ S/cm, at least $3\times10^{-3}$ S/cm, at least $5\times10^{-3}$ S/cm, etc. In one embodiment, for example, the ionic conductivity may be between $2.1\times10^{-6}$ S/cm and $5.2\times10^{-6}$ S/cm. In another embodiment, the ionic conductivity may be between $10^{-8}$ and $10^{-2}$ S/cm.

As another example, the electrode may exhibit a mass loading of at least 1 mA h/cm$^2$, 1.5 mA h/cm$^2$, 2 mA h/cm$^2$, 2.5 mA h/cm$^2$, 3 mA h/cm$^2$, 3.5 mA h/cm$^2$, 4 mA h/cm$^2$, 4.5 mA h/cm$^2$, 5 mA h/cm$^2$, 5.5 mA h/cm$^2$, 6 mA h/cm$^2$, etc. The mass loading is a measure of the design area capacity of the electrode. The area is the area of the electrode. This may be determined, for example, by weighing the electrode, calculating the active material content of the electrode (e.g., the number of ions it can contain), then calculating the design capacity according to the active material content.

In addition, in some embodiments, an electrochemical device such as those described herein may provide relatively high oxidation potentials. The electrochemical device may be particularly useful, for example, in applications where higher voltages are required. In certain cases, the oxidation potential may be at least 0.3 V, at least 0.4 V, at least 0.5 V, at least 0.6 V, at least 0.7 V, at least 0.8 V, at least 0.9 V, at least 1 V, at least 1.5 V, at least 2 V, at least 2.5 V, at least 3 V, at least 3.5 V, at least 3.8 V, at least 4 V, at least 4.5 V, at least 5.0 V, at least 5.1 V, or at least 5.5 V. Oxidation potentials can be tested using standard techniques known to those of ordinary skill in the art, such as cyclic voltammetry. Without wishing to be bound by any theory, it is believed that lithium ion batteries with high oxidation potentials may be very stable, particularly at higher voltages.

In addition, in some embodiments, using a discharging current of 0.5 C current rate, the electrochemical device may exhibit a capacity of at least 80 mA h/g, at least 90 mA h/g, at least 100 mA h/g, at least 110 mA h/g, at least 120 mA h/g, at least 130 mA h/g, at least 140 mA h/g, at least 150 mA h/g, at least 160 mA h/g, at least 170 mA h/g, at least 180 mA h/g, at least 185 mA h/g, at least 190 mA h/g, at least 200 mA h/g, or the like.

In addition, in some embodiments, after 200 cycles using a discharging current of 0.5 C current rate, the electrochemical device may exhibit a capacity retention of at least 60%, at least 72%, at least 77%, at least 82%, at least 83%, at least 84%, at least 85%, at least 86%, at least 87%, at least 88%, at least 89%, at least 90%, or the like.

In another aspect, the present disclosure generally related to various methods of making or manufacturing an electrode. In one set of embodiments, an electrode can be made by pressing particles together to form an electrode precursor, exposing the electrode precursor to a solvent comprising an electrolyte precursor, removing at least some solvent from the electrode precursor, then solidifying the electrolyte precursor within the electrode precursor, e.g., to form the electrode.

Particles that can pressed together to form an electrode include any of the particles described herein, for example, lithium nickel manganese cobalt oxide (NMC) particles or the like. The particles may also have any of the sizes, dimensions, size distributions, etc., as described herein.

A variety of methods may be used to press the particles together to form the electrode precursor. These include calendaring (optionally under heat and/or pressure), pneumatic presses, or the like.

The electrode precursor may then be exposed to a solvent comprising an electrolyte precursor, which may be used to produce any of the electrolytes described herein. For instance, the electrode precursor may be immersed, soaked, painted, coated, drop casted, or otherwise wetted by the solvent. As another example, the electrode may be heat-pressed with a heated electrolyte. Combinations of any of these are also possible; for example, the method may comprise soaking the electrode with the electrolyte, then coating an electrolyte layer on the electrode surface with the electrolyte.

A variety of solvents may be used for the electrolyte precursor. Non-limiting examples include, but are not limited to, $CH_2Cl_2$, dimethyl carbonate (DMC), ethylene carbonate (EC), diethyl carbonate (DEC), dimethoxyethane (DME), dioxolane (DOL), and/or N-propyl-N-methylpyrrolidinium bis(trifluoromethanesulfonyl) imide. Combinations of these and/or other solvents may also be used in certain case.

In some cases, the particles within the electrode precursor can be surrounded by the electrolyte; for example, the pores or interstices between the particles may be filled with electrolyte, which may allow increased contact between the particles and the electrolyte, which can decrease the internal resistance of the particles and the electrolyte.

As previously discussed, at least some of the electrolyte is present as a layer on a surface of the electrode. For example, an electrolyte layer such as those described herein may be relatively thick. For instance, the thickness of the electrolyte layer may be at least 20 micrometers, at least 30 micrometers, at least 40 micrometers, at least 50 micrometers, at least 60 micrometers, at least 70 micrometers, at least 80 micrometers, at least 90 micrometers, at least 100 micrometers, at least 200 micrometers, at least 300 micrometers, at least 400 micrometers, at least 500 micrometers, at least 600 micrometers, at least 700 micrometers, at least 800 micrometers, at least 900 micrometers, at least 1000 micrometers, etc. In addition, the electrolyte layer may be less than 1000 micrometers, less than 900 micrometers, less than 800 micrometers, less than 700 micrometers, less than 600 micrometers, less than 500 micrometers, less than 400 micrometers, less than 300 micrometers, less than 200 micrometers, less than 100 micrometers, less than 90 micrometers, less than 80 micrometers, less than 70 micrometers, less than 60 micrometers, less than 50 micrometers, less than 40 micrometers, less than 30 micrometers, less than 20 micrometers, less than 10 micrometers, etc. Combinations of any of these are also possible, e.g., the electrolyte may have a thickness of between 50 micrometers and 100 micrometers. Various methods can be used to obtain an electrolyte layer with a certain thickness. For example, in some cases, the electrode can be soaked in a vessel with a fixed height, and the height of the vessel can be used to control the thickness of the electrolyte layer on the target electrode.

In some cases, the exposure of the electrode precursor to the solvent may be performed under a controlled temperature. For example, in some embodiments, the solvent may have a temperature inclusively ranging from −22° C. to 80° C. In some cases, the temperature may be at least 22° C., at least 25° C., at least 30° C., at least 35° C., at least 40° C., at least 45° C., at least 50° C., at least 55° C., at least 60° C., at least 65° C., at least 70° C., at least 75° C., at least 80° C., and/or no more than 75° C., no more than 70° C., no more than 65° C., no more than 60° C., no more than 55° C., no more than 50° C., no more than 45° C., no more than 40° C., no more than 35° C., no more than 30° C., no more than 25° C., no more than 23° C., no more than 22° C., etc. Combinations of any of these temperatures are also possible; for instance, the temperature may be kept between 22° C. and 40° C. Any suitable method of heating may be used, for example, exposure to a hot bath, use of suitable heating equipment, or the like.

Examples of suitable solvents include, but are not limited to, $CH_2Cl_2$, tetrahydrofuran (THF), dimethyl carbonate (DMC), ethylene carbonate (EC), diethyl carbonate (DEC), dimethoxyethane (DME), dioxolane (DOL), N-propyl-N-methylpyrrolidinium bis(trifluoromethanesulfonyl) imide, or the like.

In certain embodiments, the exposure of the electrode precursor to the solvent may be performed for a controlled time. The length of the wetting time may be any time, for example, inclusively ranging from 10 hours to 100 hours. For example, the time may be at least 10 hours, at least 20 hours, at least 30 hours, at least 40 hours, at least 50 hours, at least 60 hours, at least 70 hours, at least 80 hours, at least 90 hours, at least 100 hours, and/or no more than 100 hours, no more than 90 hours, no more than 80 hours, no more than 70 hours, no more than 60 hours, no more than 50 hours, no more than 40 hours, no more than 30 hours, no more than 20 hours, no more than 10 h, etc. Combinations of any of these are also possible. For instance, the time of exposure may be between 10 hours and 30 hours. Without wishing to be bound by any theory, it is believed that with suitable temperature, suitable time and enough electrolyte can further improve wetting.

In one set of embodiments, the electrode may be soaked with the electrolyte within a mold, e.g., a polytetrafluoroethylene mold.

The method may also comprise solidifying or curing the electrolyte precursor to form the electrolyte. A variety of techniques may be used, such as applying UV light, applying heat to the electrode, or the like. These may be applied for any suitable length of time, for example, for at least 5 min, at least 10 min, at least 15 min, at least 20 min, at least 25 min, at least 30 min, etc., and/or no more than 30 min, no more than 25 min, no more than 20 min, no more than 15 min, no more than 10 min, no more than 5 min, etc. Combination of these are also possible, e.g., heat and/or light may be applied for between 10 min and 20 min.

In some cases, the electrolyte precursor may be heated to a temperature of at least 15° C., at least 20° C., at least 22° C., at least 25° C., at least 30° C., at least 35° C., at least 40° C., at least 45° C., at least 50° C., at least 55° C., at least 60° C., at least 65° C., at least 70° C., at least 80° C., at least 90° C., at least 100° C., etc. In some cases the temperature may be kept to no more than 100° C., no more than 90° C., no more than 80° C., no more than 75° C., no more than 70° C., no more than 65° C., no more than 60° C., no more than 55° C., no more than 50° C., no more than 45° C., no more than 40° C., no more than 35° C., no more than 30° C., no more than 25° C., etc. Combinations of these are also possible; for example, the electrolyte precursor may be exposed to a temperature of between 22° C. and 60° C.

In some cases, an initiator may be present, to facilitate polymerization of the electrolyte precursor. For example, the initiator may include a chemical initiator, such as Irgacure initiator, 2,2'-azobis(2-methylpropionitrile), ammonium persulfate, or other initiators known to those of ordinary skill in the art. In some cases, the initiator may be added to have a mole fraction between 0.001 and 0.01, or other suitable mole fractions to facilitate polymerization.

In addition, in some cases, during the curing process, at least some of the polymers may also cross-link, e.g., as discussed herein, which in some cases may improve mechanical properties and/or electrochemical performance. For example, exposure to UV light may facilitate the cross-linking process. As another example, thermal crosslinking may be used.

In addition, in some embodiments, the method comprises removing at least some solvent from the electrode precursor, e.g., to form the electrode. This may be done before, during, or after solidifying the electrolyte precursor within the electrode precursor, e.g., to form the electrode. In certain embodiments, the solvent may be removed through evaporation, drying, heating, or the like.

For instance, drying conditions can include, for example, any pressure, e.g., ambient pressure, or at a reduced pressure, for instance, at absolute pressures of less than 760 mmHg, less than 750 mmHg, less than 730 mmHg, less than 700 mmHg, less than 650 mmHg, less than 600 mmHg, less than 550 mmHg, less than 500 10 mmHg, less than 450 mmHg, less than 400 mmHg, less than 350 mmHg, less than 300 mmHg, less than 250 mmHg, less than 200 mmHg, less than 150 mmHg, less than 100 mmHg, less than 50 mmHg, less than 25 mmHg, less than 10 mmHg, etc.

In addition, in some cases, the drying may occur at any suitable temperature. Examples of temperatures include, but are not limited to, at least 20° C., at least 25° C. at least 30° C., at least 35° C., at least 40° C., at least 45° C., at least 50° C., at least 55° C., at least 60° C., etc. In some cases, the temperature may be no more than 60° C., no more than 55° C., no more than 50° C., no more than 45° C., no more than 40° C., no more than 35° C., no more than 30° C., no more than 25° C., no more than 20° C., etc. Combinations of any of these are also possible in other embodiments. For instance, the temperature during drying may be between 20° C. and 60° C.

The removal may occur over any suitable length of time. For example, removal conditions such as those described above may be applied for at least 5 min, at least 10 min, at least 30 min, at least 1 hour, at least 2 hours, at least 3 hours, at least 5 hours, at least 10 hours, at least 15 hours, etc.

In addition, the electrode precursor and/or the electrode may be pressed, e.g., after the electrolyte has been introduced therein. Techniques for pressing include, but are not limited to, calendaring (optionally under heat and/or pressure), pneumatic presses, or the like.

The following documents are incorporated herein by reference in their entireties: Int. Pat. Ser. Apl. No. PCT/US16/52627, entitled "High Performance Nickel-Based Positive Electroactive Material for a Lithium-Ion Battery," published as Int. Pat. Apl. Pub. No. WO 2017/053275; Int. Pat. Apl. Ser. No. PCT/US17/66381, entitled "Electroactive Materials for Lithium-Ion Batteries and Other Applications," published as Int. Pat. Apl. Pub. No. WO 2018/112182; Int. Pat. Apl. Ser. No. PCT/US18/18986, entitled "Core-Shell Electroactive Materials," published as Int. Pat. Apl. Pub. No. WO 2018/156607; U.S. Pat. Apl. Ser. No. 16/037,041, entitled "Ionomer Electrode Manufacturing Slurry," published as U.S. Pat. Apl. Pub. No. 2019/0020033; U.S. patent application Ser. No. 16/059,251, entitled "Poly (Lithium Acrylate) and Other Materials for Membranes and Other Applications," published as U.S. Pat. Apl. Pub. No. 2019/0051939; U.S. patent application Ser. No. 16/240,502, entitled "Polymer Solid Electrolyte"; and a U.S. patent application filed on even date herewith, entitled "Electrolytes for High-Voltage Cathode Materials and Other Applications."

The following examples are intended to illustrate certain embodiments of the present invention, but do not exemplify the full scope of the invention.

Example 1

This example illustrates an electrode, which is made as follows:

Step 1. Cathode preparation, using NCM811 (Nickel cobalt manganese 811) as the positive electroactive material. The cathode was prepared as follows: (i) mix ~3 wt % polyvinylidene fluoride (PVDF) binder in N-methyl-2-pyrrolidone (NMP) to form an NMP-binder mixture; (ii) mix the NMP-binder mixture with the positive electroactive material and carbon black to form a mixture containing 80 wt % positive electroactive material, 10 wt % carbon black and 10 wt % NMP-binder mixture ("the 80:10:10 mixture"); (iii) transfer the 80:10:10 mixture into a ball mill, and mill the mixture at 800 rpm for 30 min with ten 5 mm diameter zirconia balls to form a slurry, where the zirconia balls function as a medium for more effective mixing; (iv) prepare a current collector by spreading aluminum foil onto a glass plate and spraying acetone to ensure that there are no air bubbles between the foil and the glass plate; (v) applying the slurry onto the aluminum foil, spreading uniformly on to the foil using a razor blade to form a coating film; and (vi) drying the coating in a vacuum at 110° C. for 12 hours to form the cathode. All these materials can be commercially obtained.

Step 2. Polymer electrolyte solution preparation. A polymer electrolyte solution was obtained by mixing 27 wt % linear polymer (polyethylene glycol, $M_w$=100,000), crosslinkable oligomer (DA 700: poly(ethylene glycol) diacrylate), plasticizer (TEGDME: tetraethylene glycol dimethyl ether), 3 M lithium salts (lithium bis(trifluoromethanesulfonyl)imide, LiTFSI), and 0.3 wt % stabilization additive LiBoB (lithium bis(oxalato)borate)), solvent, and initiator by mechanical stirring at room temperature in the liquid state. The mixture was blended into a single-phase liquid by stirring at room temperature.

Step 3. Heat the electrolyte to 65° C. Compress the electrolyte on the cathode using a compression molding machine (Fujian Xinhong Mach & Electronic, Model HP230C-R) to form an electrolyte film on the cathode. In one embodiment, the thickness of the electrolyte may be 30 micrometers.

Example 2

This example illustrates another electrode, which is made as follows:

Step 1 and 2 are similar to Example 1.

Step 3. Coat an electrolyte layer with the electrolyte prepared in step 2 on the cathode, then apply 15-minute UV exposure to the cathode. The electrolyte should cure to form a solid-state electrolyte. Evaporate the solvent by exposing the cathode to a vacuum oven at 50° C. for 24 hours to form the electrode. In one embodiment, the thickness of the electrolyte may be 20 micrometers.

Example 3

This example illustrates yet another electrode, which is made as follows:

Step 1 and 2 are similar to Example 1.

Step 3. Soak the cathode prepared in step 1 into the electrolyte at 65° C. for 10 hours. The electrode material should be surrounded by the electrolyte, and the pores between the electrode material particles may be filled by the electrolyte. Apply 5-minute UV exposure to the cathode. The electrolyte should cure to form a solid-state electrolyte. Evaporate the solvent by exposing the cathode to a vacuum oven at 55° C. for 48 hours to form the electrode.

Example 4

This example illustrates still another electrode, which is made as follows:

Step 1 and 2 are similar to Example 1.

Step 3. Calendar the cathode, then soak the cathode prepared in step 1 into the electrolyte at 55° C. for 24 hours. The electrode material should be surrounded by the electrolyte, and the pores between the electrode material particles may be filled by the electrolyte. Coat the electrolyte layer on the cathode, then apply 15-minute UV exposure to the cathode. The electrolyte should cure to form a solid-state electrolyte. Evaporate the solvent by exposing the cathode to a vacuum oven at 60° C. for 15 hours to form the electrode. In one embodiment, the thickness of the electrolyte may be 50 micrometers.

Example 5

This example illustrates still another electrode, which is made as follows:

Step 1 and 2 are similar to Example 1.

Step 3. Soak the cathode prepared in step 1 into an electrolyte at 55° C. for 24 hours. The electrode material should be surrounded by the electrolyte, and the pores between the electrode material particles may be filled by the electrolyte. Form a flat electrolyte surface on the cathode, e.g., by drop casting the electrolyte on the cathode, or by soaking the cathode in a mold. Apply 20 minutes of UV exposure to the cathode. The electrolyte should cure to form a solid-state electrolyte. Evaporate the solvent by exposing the cathode to a vacuum oven at 55° C. for 48 hours, then calendar the cathode to form the electrode. In one embodiment, the thickness of the electrolyte may be 150 micrometers.

Example 6

In this example, various analyses were performed on the materials described in Examples 1 to 5. The following are explanations and descriptions relating to these analyses, and are not intended to be limiting.

Cycling performance. The electrodes in Examples 1 to 5 were assembled in a 2032 coin cell with lithium foil as the anode. The cycling test was performed with a Neware cycling tester. The charge/discharge voltage window was from 2.8 V to 4.5 V.

After 100 cycles at a current rate of 0.5 C, the capacity retention of the materials in Example 1 was 75%, the capacity retention of Example 2 was 70%, the capacity retention of Example 3 was 73%, the capacity retention of Example 4 was 71%, and the capacity retention of Example 5 was 79%.

Figure 2:
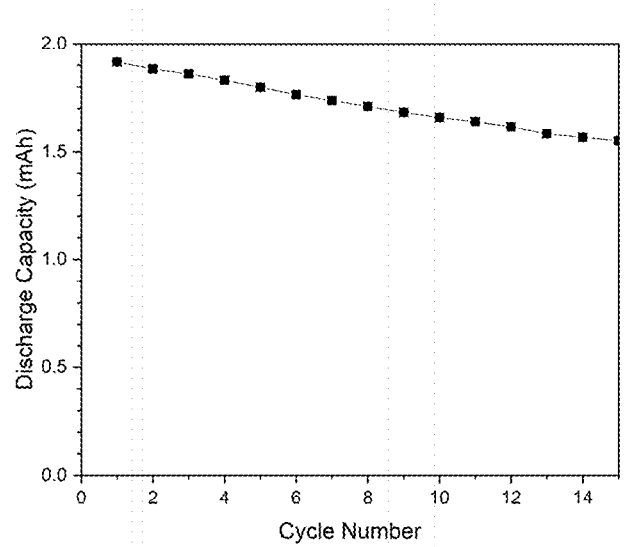
FIG. 2 illustrates cycling performance testing curves of a cell according to some embodiments of the disclosure.

FIG. 2 illustrates the discharge capacity of Example 4. It should be understood that the electrode need not be a thin film electrode, and that any of a variety of electrodes may contain solid electrolyte as discussed herein.

Figure 3:
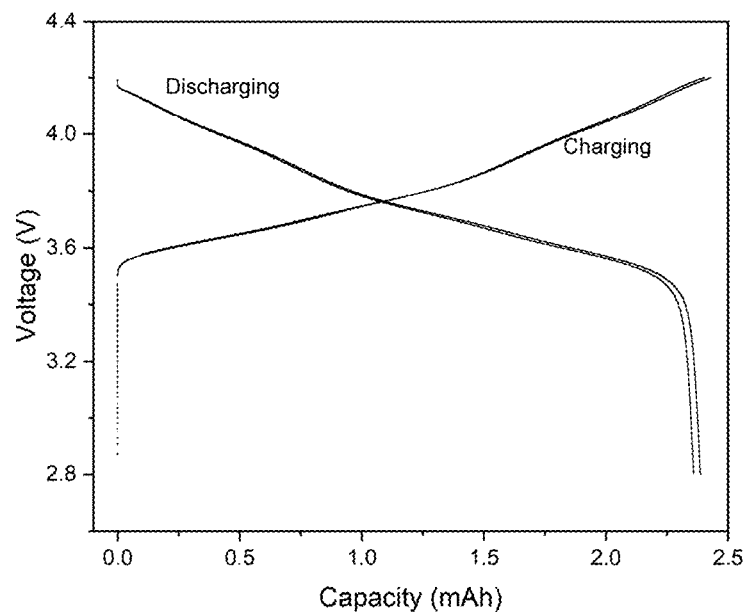
FIG. 3 illustrates cycling performance testing curves of a cell in accordance with certain embodiments of the disclosure.

FIG. 3 illustrates capacity-voltage testing curves of Example 4, with both charging and discharging curves as shown. From these capacity results, it is believed that electrodes may be suitable for Li batteries. In particular, FIG. 3 shows that solid electrolytes may be used in cathodes such as NMC cathodes. This figure also shows that the electrodes may be repeatedly charged and discharged, as the charging and discharging curves were stable and relatively repeatable.

Electrochemical Impedance Spectroscopy. Electrochemical impedance spectroscopy testing was performed by AC impedance analyzer (Interface 1010E Potentiostate, Gamry). Samples with an effective area of 1 cm$^2$ were placed in 2032 coin-type cells. The ionic conductivity was measured in the frequency range of 13 MHz to 5 Hz with a bias voltage of 10 mV.

Figure 4:
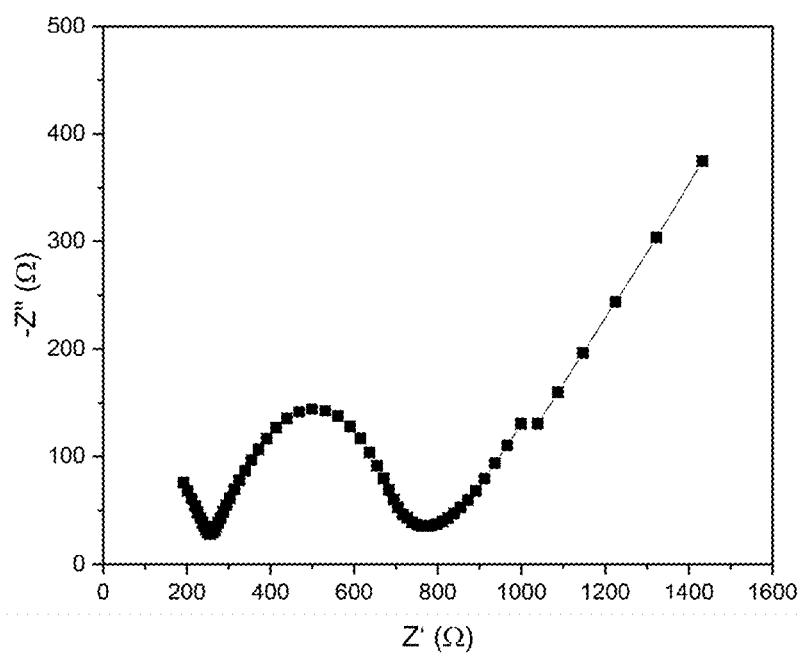
FIG. 4 illustrates electrochemical impedance spectroscopy of a battery in accordance with some embodiments of the disclosure.

FIG. 4 illustrates electrochemical impedance spectroscopy of a battery using the electrode prepared according to Example 4. The left portion between the peak and the valley indicates the internal resistance between the cathode materials and electrolyte.

Figure 5:
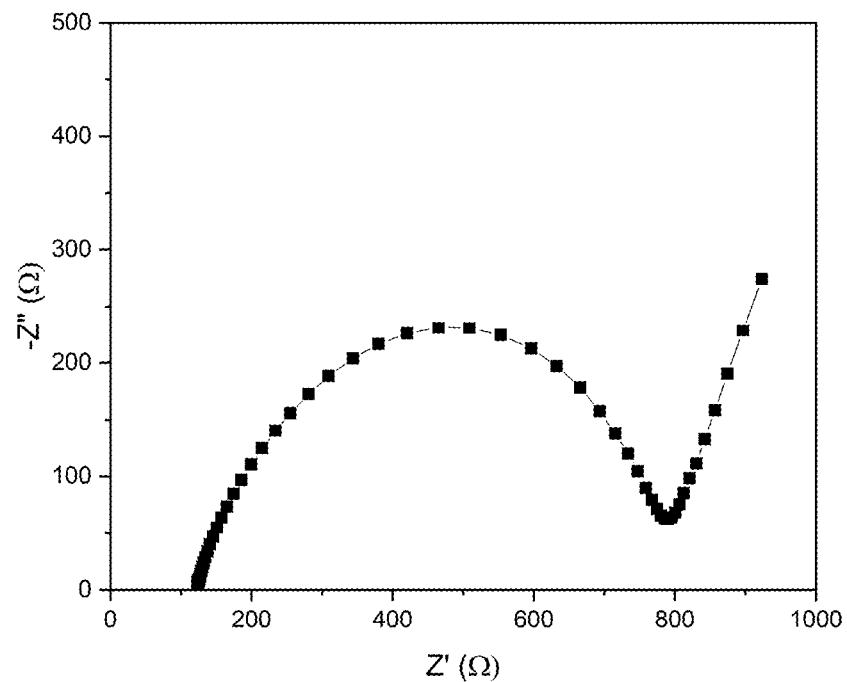
FIG. 5 illustrates electrochemical impedance spectroscopy of an electrolyte in accordance with certain embodiments of the disclosure.

FIG. 5 illustrates electrochemical impedance spectroscopy of a polymer solid electrolyte before it is used in the electrode. The far left portion between the semi-circle and the line Y=0 indicates the bulk resistance of the electrolyte. The ionic conductivity can be calculated given the thickness and area the membrane. Comparing FIG. 4 and FIG. 5 suggests that there is no difference between the resistance of the electrode and the resistance of electrolyte, indicating the contact between the electrode materials and the electrolyte is very close and tight. The internal resistance of the battery is decreased in comparison with electrodes formed using other methods. Thus, this process may benefit the charging/discharging rate performances of lithium ion batteries and help improve the battery performance.

Electrochemical stability. Electrochemical stability testing was performed using cyclic voltammetry measurements with an AC impedance analyzer (Interface 1010E Potentiostate, Gamry). Samples with an area of 1 cm$^2$ were sealed between stainless-steel plate and lithium foil (reference electrode). The operating voltage range was from 2.5 to 4.5 V with a scan rate of 10 mV/s. The experiment was conducted at room temperature.

Figure 6:
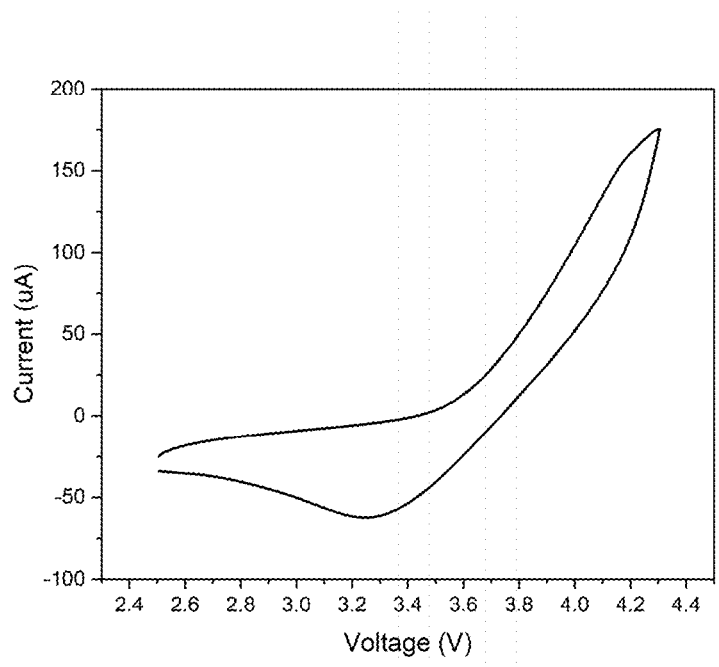
FIG. 6 illustrates electrochemical stability testing curves of a cell in accordance with certain embodiments of the disclosure.

FIG. 6 illustrates electrochemical stability testing curves of a cell using an electrode prepared in accordance with Example 4. This figure shows that the oxidation potential could reach 4.3 V and stay at that voltage for a relatively long time. The battery exhibited good oxidation potential (>4.3V), illustrating that the electrode was very stable at high voltages, suggesting that it would be useful for high voltage lithium ion cathode materials, such as NCM811.

These electrodes can be used in electrochemical cells since the electrolytes are cured to solid state, which may result in safer batteries and other electrochemical devices, e.g., as compared to liquid electrolytes.

In summary, the example methods of wetting or soaking the electrode appeared to considerably improve various electrochemical performances. The electrode material was surrounded by an electrolyte. The pores between the electrode material particles were filled by the electrolyte. The thickness of the electrolyte film could be accurately controlled. Since the electrode materials could be surrounded tightly by the electrolyte, the pores between particles of the electrode materials could be fully filled by electrolyte. The electrode materials accordingly could be wetted fully, resulting in close contact between the electrode materials and the electrolyte. This decreases the internal resistance of the battery, allowing higher battery capacities. This may allow the utility of higher capacity cathode materials in solid state batteries. These properties may also benefit charging/discharging rate performances of lithium ion batteries. In general, as described in these examples, such electrodes could fit with high capacity density and high energy cathode materials for uses such as electric vehicles.

Example 7

Commercial batteries typically use a liquid electrolyte, and the liquid electrolyte is able to flow into pores and contact cathode particles within the cathode. Thus, lithium ions can diffuse from the cathode particle to the electrolyte, and vice versa.

However, solid-state electrolytes innately do not have the fluidity of liquid electrolytes. When electrodes containing solid state electrolytes are assembled, the solid electrolyte simply sits on top of the electrode, instead of filling the pores of the electrode. As a result, only the cathode particles on top contact the electrolyte, and perform normally. Accordingly, most of the cathode particles are not able to participate in lithium ion diffusion, as they do not contact the electrolyte, e.g., as shown in FIG. 1B. As a result, the actual capacity of such an electrode will be substantially lower than the design capacity. The design capacity is calculated based on the weight of the cathode active material in the battery and the specific capacity of the cathode active material, i.e., the design capacity is the capacity of the material if all of the cathode active material participated in ion exchange with the electrolyte.

All of the cathode particles were found to be conductive with the electrolyte, and the battery exhibited close to its design capacity, even with a relatively thick electrode (higher weight loading of the cathode particle).

The electrode was prepared as follows.

Step 1 and 2 are similar to Example 1.

Step 3. Cut a coin cell size (½ inch diameter, 1.27 cm$^2$) cathode from the cathode sheet in Step 1. Weigh the cathode and obtain the total mass of the coin-cell size cathode electrode as 17.5 mg. Since the mass of Al foil for that cathode size is 5.296 mg, so the mass of cathode material on the Al foil is 17.5−5.296=12.204 mg (including NCM 811, binder PVDF and carbon black). The positive electroactive material (NCM811) takes 80 wt % in the cathode materials with the mass of (17.5 mg−5.296 mg)*0.8=9.76 mg. The first cycle discharge capacity of this positive electroactive materials is 0.195 mAh/mg. As a result, the design capacity of this coin cell size cathode electrode could be calculated as: (17.5 mg−5.296 mg)*0.8*0.195 mAh/mg=1.9 mAh for the first discharge capacity.

Step 4 are similar to step 3 in Example 4.

Step 5. Testing the cycling performance of Example 4. Results are shown in FIG. 2. From FIG. 2, the real capacity of first cycle was 1.9 mA h, which was similar to the designed capacity calculated before.

The cathode particles at the bottom of the electrode were found to be in contact with the solid-state electrolyte, and were able to perform during charging and discharging. In particular, to confirm that the cathode particles are covered by the solid electrolyte, first, the cross-section area of the post-treatment cathode was investigated by SEM. From SEM, the inner cathode particles were observed to be covered by the solid-state electrolyte. Then, the cathode electrode was assembled into a battery, and the capacity was checked to confirm that all of the cathode particle was conductive with the solid-state electrolyte, and were able to deliver their design capacity.

The mass of the cathode before treatment was measured to calculate the design capacity. After treatment, charging and discharging tests were performed to determine the actual capacity from the electrode. The actual capacity was found to match the design capacity that was calculated based on the weight of cathode. Thus, this shows that this process technique used all the capacity of the cathode, and thus, it is believed that the cathode particles within the electrode were covered by the solid-state electrolyte and were accordingly able to participate ion transport.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode layer for an electrochemical device, comprising particles of an electroactive material and a polymer solid electrolyte comprising a crosslinked polymer, wherein the particles are embedded in the polymer solid electrolyte and the polymer solid electrolyte has a weight percentage of 5%-40% in the electrode layer, wherein the polymer solid electrolyte is obtained by crosslinking a mixture comprising poly(ethylene glycol) diacrylate and (lithium bis(trifluoromethanesulfonyl) imide (LiTFSI).

2. The electrode layer of claim 1, wherein at least 50% of the particles are in contact with the polymer solid electrolyte.

3. The electrode layer of claim 1, wherein the polymer solid electrolyte fills at least 50 vol % of interstices among the particles.

4. The electrode layer of claim 1, wherein the electroactive material comprises one or more selected from the group consisting of lithium nickel cobalt manganese oxide, lithium nickel cobalt manganese aluminum oxide, lithium nickel cobalt aluminum oxide, lithium titanate, metallic lithium, lithium metal oxide, lithium manganese oxide, lithium cobalt oxide, and lithium iron phosphate.

5. The electrode layer of claim 1, wherein the particles of the electroactive material have a D50 value ranging from 3.0 micrometers to 10 micrometers.

6. An assembly for an electrochemical device, comprising an electrode layer and an electrolyte layer, wherein the electrode layer comprises particles of an electroactive material and a polymer solid electrolyte comprising a crosslinked polymer, wherein the particles are embedded in the polymer solid electrolyte, and the polymer solid electrolyte extends from the electrode layer to the electrolyte layer, wherein the polymer solid electrolyte is obtained by crosslinking a mixture comprising poly(ethylene glycol) diacrylate and (lithium bis(trifluoromethanesulfonyl) imide (LiTFSI).

7. The assembly of claim 6, wherein the polymer solid electrolyte has a weight percentage of 5%-40% in the electrode layer.

8. The assembly of claim 6, wherein the electrolyte layer has a thickness ranging from 20 μm to 1000 μm.

9. The assembly of claim 6, wherein the polymer solid electrolyte fills at least 50 vol % of interstices among the particles in the electrode layer.

10. The assembly of claim 6, wherein the electrolyte layer exhibits an ionic conductivity of at least $1\times10^{-4}$ S/m and the electrode layer exhibits a decomposition potential of at least 3.0 V.

11. An electrochemical device, comprising:
1) the electrode layer of claim 1 comprising the polymer solid electrolyte, and
2) an electrolyte layer adjacent to the electrode layer, wherein the electrolyte layer is formed by extending the polymer solid electrolyte from the electrode layer to the electrolyte layer.

12. The electrochemical device of claim 11, wherein the electrode layer is a cathode layer comprising electroactive materials for cathode.

13. A method of preparing the electrode layer of claim 1, comprising:

1) providing an untreated electrode layer comprising the particles of the electroactive material;
2) mixing a composition comprising one or more crosslinkable monomers and an electrolyte salt to form an electrolyte mixture at room temperature, wherein the one or more crosslinkable monomers comprise poly (ethylene glycol) diacrylate and the electrolyte salt comprises (lithium bis(trifluoromethanesulfonyl) imide (LiTFSI);
3) soaking the untreated electrode layer in the electrolyte mixture, leading to a soaked layer; and
4) crosslinking the one or more crosslinkable monomers in the soaked layer into the crosslinked polymer, transforming the electrolyte mixture in the soaked layer from liquid state to solid state, forming the electrode layer of claim 1, wherein the particles are embedded in the polymer solid electrolyte.

14. The method of claim 13, wherein the untreated electrode layer is prepared by:
1) mixing the particles of the electroactive material, a binder and a carbon material to form a mixture;
2) milling the mixture from step 1) in a ball mill, leading to a slurry;
3) applying the slurry to a supporting substrate to form a uniform coating; and
4) drying the uniform coating, forming the untreated electrode layer.

15. The method of claim 13, wherein the one or more crosslinkable monomers are crosslinked via a thermal crosslinking or by exposure to UV light in the presence or absence of an initiator.

16. The method of claim 13, wherein the electrolyte mixture after step 2) comprises a solvent and the solvent is removed after step 4).

17. A method of preparing the assembly of claim 6, comprising:
1) providing an untreated electrode layer comprising the particles of the electroactive material;
2) mixing a composition comprising one or more crosslinkable monomers and an electrolyte salt to form an electrolyte mixture at room temperature;
3) soaking the untreated electrode layer in the electrolyte mixture, leading to a soaked layer;
4) applying the soaked layer to the electrolyte mixture forming a coating on the soaked layer; and
5) crosslinking the one or more crosslinkable monomers in both the soaked layer and the coating into the crosslinked polymer, transforming the electrolyte mixture into the polymer solid electrolyte, forming the assembly of claim 5 comprising the electrode layer and the electrolyte layer, wherein the particles are embedded in the polymer solid electrolyte in the electrode layer, and the polymer solid electrolyte extends from the electrode layer to the electrolyte layer.

* * * * *